US012626197B2

(12) United States Patent
Lehoux-Lebacque et al.

(10) Patent No.: US 12,626,197 B2
(45) Date of Patent: May 12, 2026

(54) METHOD FOR COMPUTING A SET OF ITINERARIES FROM A DEPARTURE LOCATION TO AN ARRIVAL LOCATION USING CLUSTER-BASED SEARCHING

(71) Applicant: Naver Corporation, Seongnam-si (KR)

(72) Inventors: Vassilissa Lehoux-Lebacque, Corenc (FR); Christelle Loiodice, La Tronche (FR); Maxime Raynal, Meylan (FR)

(73) Assignee: Naver Corporation (KR)

( * ) Notice: Subject to any disclaimer, the term of this patent is extended or adjusted under 35 U.S.C. 154(b) by 741 days.

(21) Appl. No.: 17/878,336

(22) Filed: Aug. 1, 2022

(65) Prior Publication Data

US 2023/0196215 A1     Jun. 22, 2023

Related U.S. Application Data

(60) Provisional application No. 63/294,183, filed on Dec. 28, 2021, provisional application No. 63/291,632, filed on Dec. 20, 2021.

(51) Int. Cl.
G06Q 10/047 (2023.01)
G01C 21/34 (2006.01)
G06Q 50/40 (2024.01)

(52) U.S. Cl.
CPC ....... G06Q 10/047 (2013.01); G01C 21/3446 (2013.01); G06Q 50/40 (2024.01)

(58) Field of Classification Search
CPC ............ G01C 21/3446; G01C 21/3423; G01C 21/343; G01C 21/3453; G06Q 10/047; G06Q 50/40; G06Q 10/025; G06Q 50/14
See application file for complete search history.

(56) References Cited

U.S. PATENT DOCUMENTS

| | | | |
|---|---|---|---|
| 5,991,688 | A | 11/1999 | Fukushima et al. |
| 6,779,060 | B1 | 8/2004 | Azvine et al. |
| 6,785,608 | B1 | 8/2004 | Milici et al. |
| 8,005,610 | B2 | 8/2011 | Bast et al. |
| 8,335,643 | B2 | 12/2012 | Vandivier et al. |

(Continued)

FOREIGN PATENT DOCUMENTS

| | | |
|---|---|---|
| EP | 3339806 A1 | 6/2018 |
| EP | 3683742 | 7/2020 |

(Continued)

OTHER PUBLICATIONS

Wagner, Dorothea et al. "Geometric containers for efficient shortest-path computation," ACM Journal of Experimental Algorithmics, Association of Computing Machinery, New York, NY, US, vol. 10, Dec. 31, 2005 2005.

(Continued)

*Primary Examiner* — Abby J Flynn
*Assistant Examiner* — Paulo Roberto Gonzalez Leite
(74) *Attorney, Agent, or Firm* — Michael J. Nickerson

(57) ABSTRACT

A method and system for preprocessing and query stages for a trip-based public transit routing algorithm, which is used for multimodal routing computations, clusters the public transit network and computes relevant network parts when transiting between different clusters in order to prune the search at query time. The processing phase is modified to use only a subset of the network, depending on the clusters associated to the origin and destination locations.

29 Claims, 16 Drawing Sheets

(56) References Cited

U.S. PATENT DOCUMENTS

| | | | |
|---|---|---|---|
| 8,417,409 B2 | 4/2013 | Bast et al. | |
| 8,494,771 B2 | 7/2013 | Delling et al. | |
| 8,504,034 B2 | 8/2013 | Miyake et al. | |
| 8,786,605 B1 | 7/2014 | Curtis et al. | |
| 9,082,134 B2 | 7/2015 | Gishen | |
| 10,036,647 B2 | 7/2018 | Barraci et al. | |
| 10,436,597 B1 | 10/2019 | Faaborg | |
| 2002/0059025 A1 | 5/2002 | Kim et al. | |
| 2003/0109266 A1 | 6/2003 | Rafiah et al. | |
| 2004/0218536 A1 | 11/2004 | Yasukawa et al. | |
| 2005/0043884 A1 | 2/2005 | Atarashi | |
| 2007/0008949 A1 | 1/2007 | Balandin | |
| 2008/0075007 A1 | 3/2008 | Mehta et al. | |
| 2010/0036606 A1 | 2/2010 | Jones | |
| 2010/0082245 A1 | 4/2010 | Patenaude et al. | |
| 2010/0153004 A1 | 6/2010 | Natsume | |
| 2010/0228574 A1 | 9/2010 | Mundinger et al. | |
| 2010/0280748 A1 | 11/2010 | Mundinger et al. | |
| 2010/0280853 A1 | 11/2010 | Petralia et al. | |
| 2010/0305984 A1 | 12/2010 | Ben-Yitschak et al. | |
| 2011/0112759 A1* | 5/2011 | Bast ................... | G01C 21/3423 |
| | | | 701/533 |
| 2011/0125666 A1 | 5/2011 | Laurent et al. | |
| 2011/0302214 A1 | 12/2011 | Frye et al. | |
| 2012/0008536 A1 | 1/2012 | Borghei | |
| 2012/0253657 A1 | 10/2012 | Francis | |
| 2013/0060468 A1 | 3/2013 | Delling et al. | |
| 2013/0204525 A1* | 8/2013 | Pfeifle ............... | G01C 21/3469 |
| | | | 701/400 |
| 2013/0261967 A1 | 10/2013 | Shinagawa et al. | |
| 2013/0262222 A1 | 10/2013 | Gibson et al. | |
| 2013/0304378 A1 | 11/2013 | Graells et al. | |
| 2014/0200807 A1 | 7/2014 | Geisberger | |
| 2014/0257697 A1* | 9/2014 | Gishen ............... | G01C 21/3423 |
| | | | 701/537 |
| 2014/0278086 A1 | 9/2014 | San Filippo et al. | |
| 2014/0343974 A1 | 11/2014 | Graells et al. | |
| 2015/0095355 A1 | 4/2015 | Patton | |
| 2015/0356759 A1 | 12/2015 | Delling et al. | |
| 2015/0371157 A1 | 12/2015 | Jaffe | |
| 2016/0033283 A1 | 2/2016 | Ulloa Paredes | |
| 2016/0203422 A1 | 7/2016 | Demarchi et al. | |
| 2017/0123421 A1 | 5/2017 | Kentley et al. | |
| 2018/0038706 A1 | 2/2018 | Ellenby et al. | |
| 2018/0102985 A1 | 4/2018 | Byers et al. | |
| 2019/0057340 A1 | 2/2019 | Wang | |
| 2019/0130350 A1 | 5/2019 | Nguyen et al. | |
| 2019/0212157 A1* | 7/2019 | Wu ........................ | H04W 4/029 |
| 2019/0383621 A1 | 12/2019 | Isaacs et al. | |
| 2019/0383622 A1 | 12/2019 | Aich et al. | |
| 2019/0392368 A1 | 12/2019 | Raghunathan et al. | |
| 2020/0134747 A1 | 4/2020 | Zhang | |
| 2020/0173808 A1 | 6/2020 | Beaurepaire et al. | |
| 2020/0182637 A1 | 6/2020 | Kumar et al. | |
| 2020/0272954 A1 | 8/2020 | Serra et al. | |
| 2020/0378773 A1 | 12/2020 | Lehoux-Lebacque et al. | |
| 2021/0182751 A1 | 6/2021 | Pan et al. | |
| 2021/0248633 A1 | 8/2021 | Simpson | |
| 2022/0065651 A1 | 3/2022 | Beaurepaire et al. | |
| 2022/0095079 A1 | 3/2022 | Volkerink et al. | |

FOREIGN PATENT DOCUMENTS

| | | |
|---|---|---|
| IN | 4559CHE2012 | 5/2014 |
| JP | 2007520685 | 7/2007 |
| JP | 2013511095 | 3/2013 |
| JP | 2014032139 A | 2/2014 |
| JP | 2016045020 | 4/2016 |
| JP | 2017075967 A | 4/2017 |
| JP | 2018109621 A | 7/2018 |
| KR | 20180081022 | 7/2017 |
| WO | 2005013234 A1 | 2/2005 |
| WO | WO2008142783 A1 | 11/2008 |
| WO | WO201718583 | 11/2017 |

OTHER PUBLICATIONS

Delling, Daniel et al. "Computing Multimodal Journeys in Practice," Jun. 5, 2013, Experimental Algorithms, Springer Berlin Heidelberg, Berlin, Heidelberg, pp. 260-271, XP047028461 2013.

Sascha Witt, "Trip-Based Public Transportation Routing," Nov. 12, 2015 (Nov. 12, 2015), Proc. Int.Conf. Adv. Biometrics (ICB); [Lecture Notes in Computer Science; Lect.Notes Computer], Springer, Berlin, Heidelberg, pp. 1025-1036, XP047414792 2015.

European Search Report for EP 19305064.8 (Apr. 18, 2019).

Dorothea Wagner et al: "Geometric containers for efficient shortest-path computation", ACM Journal of Experimental Algorithmics, Association of Computing Machinery, New York, NY, US, vol. 10, Dec. 31, 2005 (Dec. 31, 2005), pp. 1.3-es, XP058137002, ISSN: 1084-6654, DOI: 10.1145/1064546.1103378 2005.

Office Action of the European Patent Office for corresponding European Patent Application 19305687.6 filed Nov. 16, 2022.

Witt, Sasha "Trip Based Public Transit Routing," N. Bansal and I. Finocchi (Eds.): ESA 2015, LNCS 9294, pp. 1025-1036, 2015 2015.

Daniel Delling et al., "Computing Multimodal Journeys in Practice," V. Bonifaci et al. (Eds.): SEA 2013, LNCS 7933, pp. 260-271, 2013 2013.

Translation of IN 4559/CHE/2012 A retrieved from IP.com on Mar. 30, 2023 (Year: 2023).

Translation of KR-20180081022-A retrieved from Espacenet on Mar. 8, 2024 (Year: 2024).

Artigues, Christian, Marie-josé Huguet, Fallou Gueye, Frédéric Schettini, and Laurent Dezou. State-Based Accelerations and Bidirectional Search for Bi-Objective Multi-Modal Shortest Paths, 2013. 2013.

Barrett, Chris, Riko Jacob, and Madhav Marathe. 'Formal-Language-Constrained Path Problems'. SIAM Journal on Computing 30 (2000): 200-0. 2000.

Bast, Hannah, Mirko Brodesser, and Sabine Stor. 'Result Diversity for Multi-Modal Route Planning'. In 13th Workshop on Algorithmic Approaches for Transportation Modelling, Optimization, and Systems, vol. 33 of OpenAccess Series in Informatics (OASIcs), pp. 123-136, Dagstuhl, 2013. 2013.

Bast, Hannah, Erik Carlsson, Arno Eigenwillig, Robert Geisberger, Chris Harrelson, Veselin Raychev, and Fabien Viger. 'Fast Routing in Very Large Public Transportation Networks Using Transfer Patterns'. In In Proceedings of the 18th Annual European Conference on Algorithms: Part I, ESA'10, 290-301. Springer-Verlag, 2010. 2010.

Bast, Hannah, Daniel Delling, Andrew V. Goldberg, Matthias Müller-hannemann, Thomas Pajor, Peter Sanders, Dorothea Wagner, and Renato F. Werneck. 'Route Planning in Transportation Networks', 2014. 2014.

Delling, Daniel, Julian Dibbelt, Thomas Pajor, Dorothea Wagner, and Renato F. Werneck. Computing Multimodal Journeys in Practice?, n.d. 2018.

Daniel Delling, Thomas Pajor, and Renato F. Werneck. Round-based public transit routing. In Proceedings of the Fourteenth Workshop on Algorithm Engineering and Experiments (ALENEX), 2013. 2013.

Dibbelt, Julian, Thomas Pajor, Ben Strasser, and Dorothea Wagner. 'Intriguingly Simple and Fast Transit Routing'. In In SEA, vol. 7933 of LNCS, 43-54. Springer, 2013. 2013.

Julian Dibbelt, Thomas Pajor, and Dorothea Wagner. User-constrained multi-modal route planning. In SIAM, editor, Proceedings of the 14th Meeting on Algorithm Engineering and Experiments (ALENEX12), p. 118129, 2012 2012.

Garey M. R. and D. S. Johnson. Computers and intractability: A guide to the theory of NP-completeness. Freeman, 1979. 1979.

Geisberger, Robert, Peter Sanders, Dominik Schultes, and Daniel Delling. 'Contraction Hierarchies: Faster and Simpler Hierarchical Routing in Road Networks'. In Experimental Algorithms, edited by Catherine C. McGeoch, 5038:319-33. Berlin, Heidelberg: Springer Berlin Heidelberg, 2008. https://doi.org/10.1007/978-3-540-68552-4_24. 2008.

Goldberg, Andrew V., and Chris Harrelson. 'Computing the Shortest Path: A Search Meets Graph Theory'. In Proceedings of the Six-

(56)            References Cited

OTHER PUBLICATIONS teenth Annual ACM-SIAM Symposium on Discrete Algorithms, 156-165. SODA '05. Vancouver, British Columbia: Society for Industrial and Applied Mathematics, 2005 2005.

Hansen, Pierre. 'Bicriterion Path Problems'. In Multiple Criteria Decision Making Theory and Application, edited by Günter Fandel and Tomas Gal, 177:109-27. Berlin, Heidelberg: Springer Berlin Heidelberg, 1980. https://doi.org/10.1007/978-3-642-48782-8_9. 1980.

Idri, Abdelfattah, Mariyem Oukarfi, Azedine Boulmakoul, Karine Zeitouni, and Ali Masri. 'A Distributed Approach for Shortest Path Algorithm in Dynamic Multimodal Transportation Networks'. Transportation Research Procedia 27 (2017): 294-300. https://doi.org/10.1016/j.trpro.2017.12.094. 2017.

Kirchler, Dominik. 'Efficient Routing on Multi-Modal Transportation Networks'. Phdthesis, Ecole Polytechnique X, 2013. https://pastel.archives-ouvertes.fr/pastel-00877450. 2013.

Liu, Lu, and Liqiu Meng. 'Algorithms of Multi-Modal Route Planning Based on the Concept of Switch Point'. Photogrammetrie—Fernerkundung—Geoinformation 2009, No. 5 (Nov. 1, 2009): 431-44. https://doi.org/10.1127/1432-8364/2009/0031. 2009.

Liu, Xudong, Christian Fritz, and Matthew Klenk. 'On Extensibility and Personalizability of Multi-Modal Trip Planning', n. d., 7. 2018.

Ulloa Luis, Lehoux Vassilissa, Roulland Frederic. Trip planning within a multimodal urban mobility, IET Intelligent Transport Systems, 12(2):87-92, 2018. 2018.

Witt, Sascha. 'Trip-Based Public Transit Routing'. ArXiv:1504.07149 [Cs] 9294 (2015): 1025-36. https://doi.org/10.1007/978-3-662-48350-3_85. 2015.

Witt, Sacha. Trip-based public transit routing using condensed search trees. In Marc Goerigk and Renato Werneck, editors, 16th Workshop on Algorithmic Approaches for Transporation Modelling, Optimization, and Systems (ATMOS16), No. 10, 2016. 2016.

Bast, Hannah, Daniel Delling, Andrew Goldberg, Matthias Müller-Hannemann, Thomas Pajor, Peter Sanders, Dorothea Wagner, and Renato F. Werneck. 'Route Planning in Transportation Networks'. ArXiv:1504.05140 [Cs], Apr. 20, 2015. http://arxiv.org/abs/1504.05140. 2015.

Web page: https://data.grandlyon.com/ Home • Métropolitan Data of the Grand Lyon.Pdf, n.d. 2018.

Web page : https://opendata.stif.info. 'Home page—Portail Open Data Île-de-France Mobilités—Open Data Île-de-France Mobilités. Pdf', n.d. 2018.

"General transit feed standard format reference documentation," https://developers.google.com/transit/gtfs/reference/2018.

E. Cohen, E. Halperin, H. Kaplan, and U. Zwick. Reachability and distance queries via 2-hop labels. SIAM Journal on Computing, 32(5):13381355, 2003 2003.

Julian Dibbelt, Thomas Pajor, and Renato F. Werneck. Public transit labeling. In Bampis E., editor, Experimental Algorithms SEA 2015, vol. 9125 of Lecture Notes in Computer Science. Springer, 2015 2015.

Matthias Hertel Hannah Bast and Sabine Storandt. Scalable transfer patterns. In Proceedings of the Eighteenth Workshop on Algorithm Engineering and Experiments (ALENEX), 2016 2016.

Hannah Bast, Mirko Brodesser, and Sabine Storandt. Result Diversity for Multi-Modal Route Plan-ning. In Daniele Frigioni and Sebastian Stiller, editors, 13th Workshop on Algorithmic Approaches for Transportation Modelling, Optimization, and Systems, vol. 33 of OpenAccess Series in Infor¬matics (OASIcs), pp. 123-136, Dagstuhl, Germany, 2013. Schloss Dagstuhl-Leibniz-Zentrum fuer Informatik 2013.

Moritz Baum, Valentin Buchhold, Jonas Sauer, Dorothea Wagner, and Tobias Zundorf. Unlimited transfers for multi-modal route planning: An efficient solution. In Proceedings of ESA 2019, to appear, 2019 2019.

Vassilissa Lehoux and Darko Drakulic. Mode Personalization in Trip-Based Transit Routing. In Gianlorenzo D'Angelo and Twan Dollevoet, editors, 19th Workshop on Algorithmic Approaches for Transportation Modelling, Optimization, and Systems (ATMOS 2019), vol. 75 of OpenAccess Series in Informatics (OASIcs), Dagstuhl, Germany, 2019. Schloss Dagstuhl-Leibniz-Zentrum fuer Informatik 2019.

Ile De France Mobilités. Open data. https://www.iledefrance-mobilites.fr 2018.

Duc-Minh Phan and Laurent Viennot. Fast public transitrouting with unrestrict-edwalking through hub labeling. In Proceedings of the Special Event on Analysis of Experimental Algorithms (SEA2), Lecture Notes in Computer Science. Springer, 2019. 2019.

Dorothea Wagner and Tobias Zundorf. Public Transit Routing with Unrestricted Walking. In Gianlorenzo D'Angelo and Twan Dollevoet, editors, 17th Workshop on Algorithmic Approaches for Transportation Modelling, Optimization, and Systems (ATMOS 2017), vol. 59 of OpenAccess Series in Informatics (OASIcs), pp. 7:1-7:14, Dagstuhl, Germany, 2017. Schloss Dagstuhl-Leibniz-Zentrum fuer Informatik. 2017.

U.S. Appl. No. 16/830,609, filed Mar. 26, 2020, entitled, "Methods for Preprocessing a Set of Feasible Transfers for Computing Itineraries in a Multimodal Transportation Network" 2020.

U.S. Appl. No. 16/830,621, filed Mar. 26, 2020, entitled, "Method for Preprocessing a Set of Non-Scheduled Lines Within a Multimodal Transportation Network of Predetermined Stations and for Computing at Least One Itinerary From a Departure Location to an Arrival Location" 2020.

U.S. Appl. No. 16/700,096, filed Dec. 2, 2019, entitled, "Method for Computing at Least One Itinerary From a Departure Location to an Arrival Location" 2019.

U.S. Appl. No. 16/853,914, filed Apr. 21, 2020, entitled, "Method for Computing an Itinerary From a Departure Location to an Arrival Location" 2020.

Ile De France Mobilités. Open data. https://www.iledefrance-mobilites.fr 2019.

U.S. Appl. No. 16/995,969, filed Aug. 18, 2020, entitled, "Method for Computing an Itinerary From a Departure Location to an Arrival Location" 2020.

European Search Report for EP 19305687.6 (Jul. 25, 2019) Jul. 25, 2019.

European Search Report for EP 19305689.2 (Jul. 26, 2019) Jul. 26, 2019.

Office Action from Japanese Patent Office for Japanese Patent Application No. 2020-093731 (Japanese copunter part to U.S. Appl. No. 16/830,621) Mar. 23, 2021 2021.

English Translation of Abstract of Published Japanese Patent Application No. JP 2014-032139 (A) 2014.

English Translation of Abstract of Published Japanese Patent Application No. JP 2017-075967 (A) 2017.

English Translation of Abstract of Published Japanese Patent Application No. JP 2018-109621 (A) 2018.

Office Action from Japanese Patent Office for Japanese Patent Application No. 2020-093731 (Japanese copunter part to U.S. Appl. No. 16/830,621) May 11, 2021 May 11, 2021.

English Translation of Abstract of Published Japanese Patent Application No. JP 2007-520685 (A) Jul. 26, 2007 2007.

English Translation of Abstract of Published Japanese Patent Application No. JP 2016-045020 (A) Apr. 4, 2016 2016.

English Translation of Abstract of Published Japanese Patent Application No. JP 2013-511095 (A) Feb. 28, 2013 2013.

U.S. Appl. No. 17/335,402, filed Jun. 1, 2021, entitled, "Method for Computing a Personalized Itinerary From a Departure Location to an Arrival Location" 2021.

Graphs—Dijkstra Alghorithm, youtube webpages extract, uploaded Apr. 2 2008Graphs—Dijkstra Alghorithm, youtube webpages 2008.

Julian Dibbelt et al. Mutimodal route and Tour Planning in Urban Environments, 6 pages. 2017.

Andreev, Konstantin and Harald Racke. "Balanced Graph Partitioning," 2006 2006.

Bast, Hannah, Jonas Sternisko, and Sabine Storandt. "Delay-Robustness of Transfer Patterns in Public Transportation Route Planning." In ATMOS, 2013. 2013.

Delling Daniel, Julian Dibbelt and Thomas Pajor. "Fast and Exact Public Transit Routing with Restricted Pareto Sets", ALENEX, 2019 2019.

(56)    References Cited

OTHER PUBLICATIONS

Delling, Daniel, Julian Dibbelt, Thomas Pajor, and Renato F. Werneck. "Public Transit Labeling." In Experimental Algorithms, edited by Evripidis Bampis, 9125:273-85. Lecture Notes in Computer Science. Cham: Springer International Publishing, 2015 2015.

Delling, Daniel, Julian Dibbelt, Thomas Pajor, and Tobias Zündorf. "Faster Transit Routing by Hyper Partitioning." Application/pdf, 2017 2017.

Delling, Daniel, Andrew V. Goldberg, Thomas Pajor, and Renato F. Werneck. "Customizable Route Planning." In Experimental Algorithms, edited by Panos M. Pardalos and Steffen Rebennack, 6630:376-87. Lecture Notes in Computer Science. Berlin, Heidelberg: Springer Berlin Heidelberg, 2011 2011.

Delling, Daniel, Andrew V. Goldberg, Ilya Razenshteyn, and Renato F. Werneck. "Graph Partitioning with Natural Cuts." In In IPDPS. IEEE Computer Society, 2011 2011.

Ester, Martin, Hans-Peter Kriegel, and Xiaowei Xu. "A Density-Based Algorithm for Discovering Clusters in Large Spatial Databases with Noise," in KDD, 1996 1996.

Flinsenberg, Ingrid. "Creating Graph Partitions for Fast Optimum Route Planning,". In WSEAS, 2004 2004.

Geisberger, Robert. "Contraction of Timetable Networks with Realistic Transfers." ArXiv:0908.1528 [Cs], Aug. 12, 2009 2009.

Holzer, Martin, Frank Schulz, and Dorothea Wagner. "Engineering Multi-Level Overlay Graphs for Shortest-Path Queries," ACM Journal of Experimental Algorithmics, 2009 2009.

Karypis, George, and Vipin Kumar. "A Fast and High Quality Multilevel Scheme for Partitioning Irregular Graphs." SIAM Journal on Scientific Computing 20, No. 1: 359-92. 1999 1999.

Kirchler, Dominik, Leo Liberti, and Roberto Wolfler Calvo. "Efficient Computation of Shortest Paths in Time-Dependent Multi-Modal Networks." ACM Journal of Experimental Algorithmic, 2014 2014.

Macqueen, J. "Some methods for classification and analysis of multivariate observations." In Proceedings of the Fifth Berkeley Symposium on Mathematical Statistics and Probability, 1967 1967.

Pyrga, Evangelia, Frank Schulz, Dorothea Wagner, and Christos Zaroliagis. "Efficient Models for Timetable Information in Public Transportation Systems." ACM Journal of Experimental Algorithmics, 2008 2008.

Raith, Andrea, Marie Schmidt, Anita Schöbel, and Lisa Thom. "Extensions of Labeling Algorithms for Multi-Objective Uncertain Shortest Path Problems." Networks 72, No. 1: 84-127, 2018 2018.

Sanders, Peter, and Christian Schulz. "Think Locally, Act Globally: Highly Balanced Graph Partitioning." In Experimental Algorithms, edited by Vincenzo Bonifaci, Camil Demetrescu, and Alberto Marchetti-Spaccamela, 7933:164-75. Lecture Notes in Computer Science. Berlin, Heidelberg: Springer Berlin Heidelberg, 2013 2013.

Schulz, Frank, Dorothea Wagner, and Christos Zaroliagis. "Using Multi-Level Graphs for Timetable Information in Railway Systems." In Algorithm Engineering and Experiments, edited by David M. Mount and Clifford Stein, 2409:43-59. Lecture Notes in Computer Science. Berlin, Heidelberg: Springer Berlin Heidelberg, 2002 2002.

Strasser, Ben, and Dorothea Wagner. "Connection Scan Accelerated." In 2014 Proceedings of the Sixteenth Workshop on Algorithm Engineering and Experiments (ALENEX), edited by Catherine C. McGeoch and Ulrich Meyer, 125-37. Philadelphia, PA: Society for Industrial and Applied Mathematics, 2014 2014.

Sungwon Jung, and S. Pramanik. "An Efficient Path Computation Model for Hierarchically Structured Topographical Road Maps." IEEE Transactions on Knowledge and Data Engineering 14, No. 5: 1029-46, 2002 2002.

* cited by examiner

---

Figure 6:
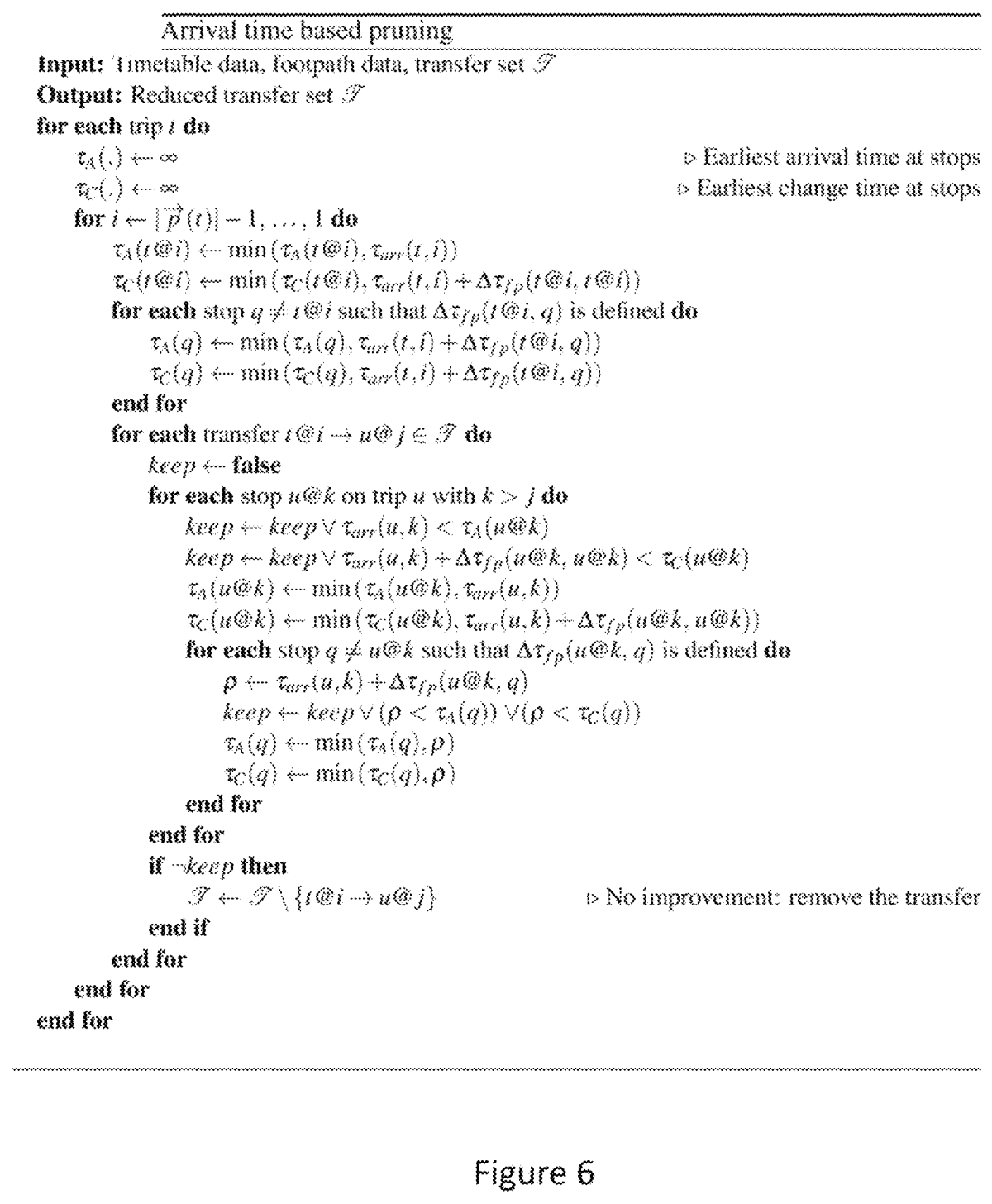

Arrival time based pruning

---

Input: Timetable data, footpath data, transfer set $\mathscr{T}$
Output: Reduced transfer set $\mathscr{T}$
for each trip $t$ do
    $\tau_A(.) \leftarrow \infty$                                        ▷ Earliest arrival time at stops
    $\tau_C(.) \leftarrow \infty$                                        ▷ Earliest change time at stops
    for $i \leftarrow |\vec{p}(t)| - 1, \ldots, 1$ do
       $\tau_A(t@i) \leftarrow \min\left(\tau_A(t@i), \tau_{arr}(t,i)\right)$
       $\tau_C(t@i) \leftarrow \min\left(\tau_C(t@i), \tau_{arr}(t,i) + \Delta\tau_{fp}(t@i, t@i)\right)$
       for each stop $q \neq t@i$ such that $\Delta\tau_{fp}(t@i, q)$ is defined do
          $\tau_A(q) \leftarrow \min\left(\tau_A(q), \tau_{arr}(t,i) + \Delta\tau_{fp}(t@i, q)\right)$
          $\tau_C(q) \leftarrow \min\left(\tau_C(q), \tau_{arr}(t,i) + \Delta\tau_{fp}(t@i, q)\right)$
       end for
       for each transfer $t@i \to u@j \in \mathscr{T}$ do
          $keep \leftarrow$ false
          for each stop $u@k$ on trip $u$ with $k > j$ do
             $keep \leftarrow keep \vee \tau_{arr}(u,k) < \tau_A(u@k)$
             $keep \leftarrow keep \vee \tau_{arr}(u,k) + \Delta\tau_{fp}(u@k, u@k) < \tau_C(u@k)$
             $\tau_A(u@k) \leftarrow \min\left(\tau_A(u@k), \tau_{arr}(u,k)\right)$
             $\tau_C(u@k) \leftarrow \min\left(\tau_C(u@k), \tau_{arr}(u,k) + \Delta\tau_{fp}(u@k, u@k)\right)$
             for each stop $q \neq u@k$ such that $\Delta\tau_{fp}(u@k, q)$ is defined do
                $\rho \leftarrow \tau_{arr}(u,k) + \Delta\tau_{fp}(u@k, q)$
                $keep \leftarrow keep \vee (\rho < \tau_A(q)) \vee (\rho < \tau_C(q))$
                $\tau_A(q) \leftarrow \min\left(\tau_A(q), \rho\right)$
                $\tau_C(q) \leftarrow \min\left(\tau_C(q), \rho\right)$
             end for
          end for
          if $\neg keep$ then
             $\mathscr{T} \leftarrow \mathscr{T} \setminus \{t@i \to u@j\}$          ▷ No improvement: remove the transfer
          end if
       end for
    end for
end for

Transfer set building

---

Input: Timetable data, footpath data
Output: Reduced transfer set $\mathscr{T}$
$\mathscr{T} \leftarrow \emptyset$
for each line $L$ do
    $\mathscr{T}(L) \leftarrow LINE\_TRANSFERS(L)$
    for each trip $t$ of $L$ do
        $T \leftarrow \emptyset$                 ▷ Transfer set for each target line
        $L_{prev} \leftarrow$ null
        for each transfer $(i, L'@j, \Delta)$ of $\mathscr{T}(L)$ do
            if $L_{prev} \neq L'$ then
                $\mathscr{T} \leftarrow \mathscr{T} \cup T$
                $T \leftarrow \emptyset, L_{prev} = L'$
            end if
            $t' \leftarrow$ earliest trip of $L'$ at $j$ such that $\tau_{dep}(t', j) \geq \tau_{arr}(t, i) + \Delta$
            if $T = \emptyset$ then
                $T(L') \leftarrow \{t@i \rightarrow t'@j\}$
            else
                if $t@i \rightarrow t'@j$ is not dominated by an element of $T$ then
                    Update $T$ with $t@i \rightarrow t'@j$
                end if
            end if
        end for
        $\mathscr{T} \leftarrow \mathscr{T} \cup T$
    end for
end for
return $\mathscr{T}$ procedure LINE\_TRANSFERS(line $L$, footpath data)      ▷ Builds the line neighborhood
    for $i \leftarrow |\vec{p}(L)| - 1, \ldots, 1$ do
        for each stop $q$ such that $\Delta\tau_{fp}(L@i, q)$ is defined do
            for each $(L', j)$ such that $q = L'@j$ do
                $\mathscr{T} \leftarrow \mathscr{T} \cup (i, L'@j, \Delta\tau_{fp}(L@i, L'@j))$
            end for
        end for
    end for
    Sort $\mathscr{T}$ first by target line, then by decreasing origin line index, then by increasing target line index, then by chosen sorting in case of tides
    return $\mathscr{T}$
end procedure

Figure 8:
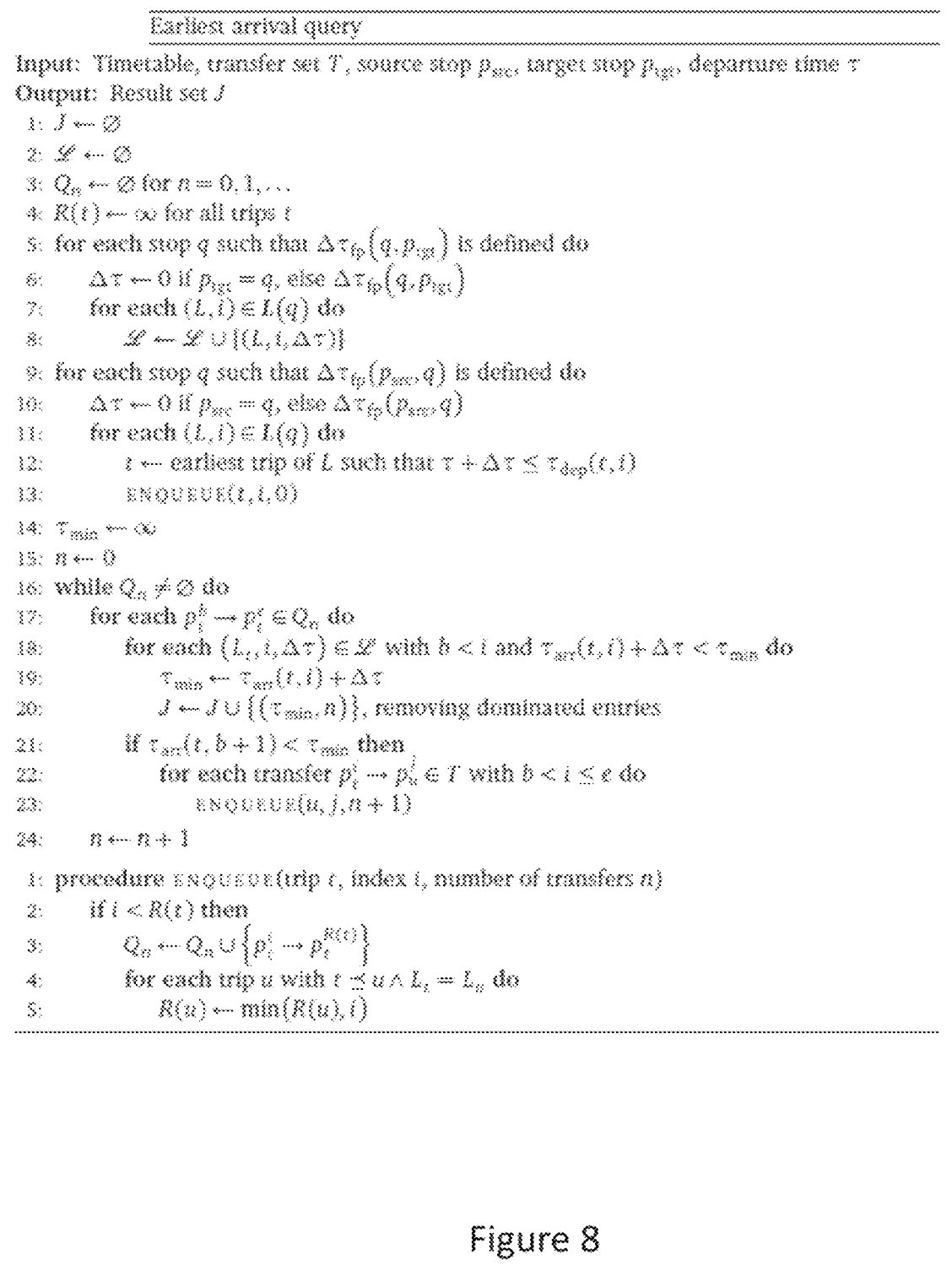

Earliest arrival query

Input: Timetable, transfer set $T$, source stop $p_{src}$, target stop $p_{tgt}$, departure time $\tau$
Output: Result set $J$
1: $J \leftarrow \varnothing$
2: $\mathscr{L} \leftarrow \varnothing$
3: $Q_n \leftarrow \varnothing$ for $n = 0, 1, \ldots$
4: $R(t) \leftarrow \infty$ for all trips $t$
5: for each stop $q$ such that $\Delta\tau_{fp}\left(q, p_{tgt}\right)$ is defined do
6:     $\Delta\tau \leftarrow 0$ if $p_{tgt} = q$, else $\Delta\tau_{fp}\left(q, p_{tgt}\right)$
7:     for each $(L, i) \in L(q)$ do
8:         $\mathscr{L} \leftarrow \mathscr{L} \cup \{(L, i, \Delta\tau)\}$
9: for each stop $q$ such that $\Delta\tau_{fp}\left(p_{src}, q\right)$ is defined do
10:    $\Delta\tau \leftarrow 0$ if $p_{src} = q$, else $\Delta\tau_{fp}\left(p_{src}, q\right)$
11:    for each $(L, i) \in L(q)$ do
12:        $t \leftarrow$ earliest trip of $L$ such that $\tau + \Delta\tau \leq \tau_{dep}(t, i)$
13:        ENQUEUE$(t, i, 0)$
14: $\tau_{min} \leftarrow \infty$
15: $n \leftarrow 0$
16: while $Q_n \neq \varnothing$ do
17:    for each $p_t^b \rightarrow p_t^e \in Q_n$ do
18:        for each $(L_t, i, \Delta\tau) \in \mathscr{L}$ with $b < i$ and $\tau_{arr}(t, i) + \Delta\tau < \tau_{min}$ do
19:            $\tau_{min} \leftarrow \tau_{arr}(t, i) + \Delta\tau$
20:            $J \leftarrow J \cup \{(\tau_{min}, n)\}$, removing dominated entries
21:        if $\tau_{arr}(t, b + 1) < \tau_{min}$ then
22:            for each transfer $p_t^i \rightarrow p_u^j \in T$ with $b < i \leq e$ do
23:                ENQUEUE$(u, j, n + 1)$
24:    $n \leftarrow n + 1$ 1: procedure ENQUEUE(trip $t$, index $i$, number of transfers $n$)
2:     if $i < R(t)$ then
3:         $Q_n \leftarrow Q_n \cup \left\{p_t^i \rightarrow p_t^{R(t)}\right\}$
4:         for each trip $u$ with $t \preceq u \wedge L_t = L_u$ do
5:             $R(u) \leftarrow \min(R(u), i)$

Figure 12:
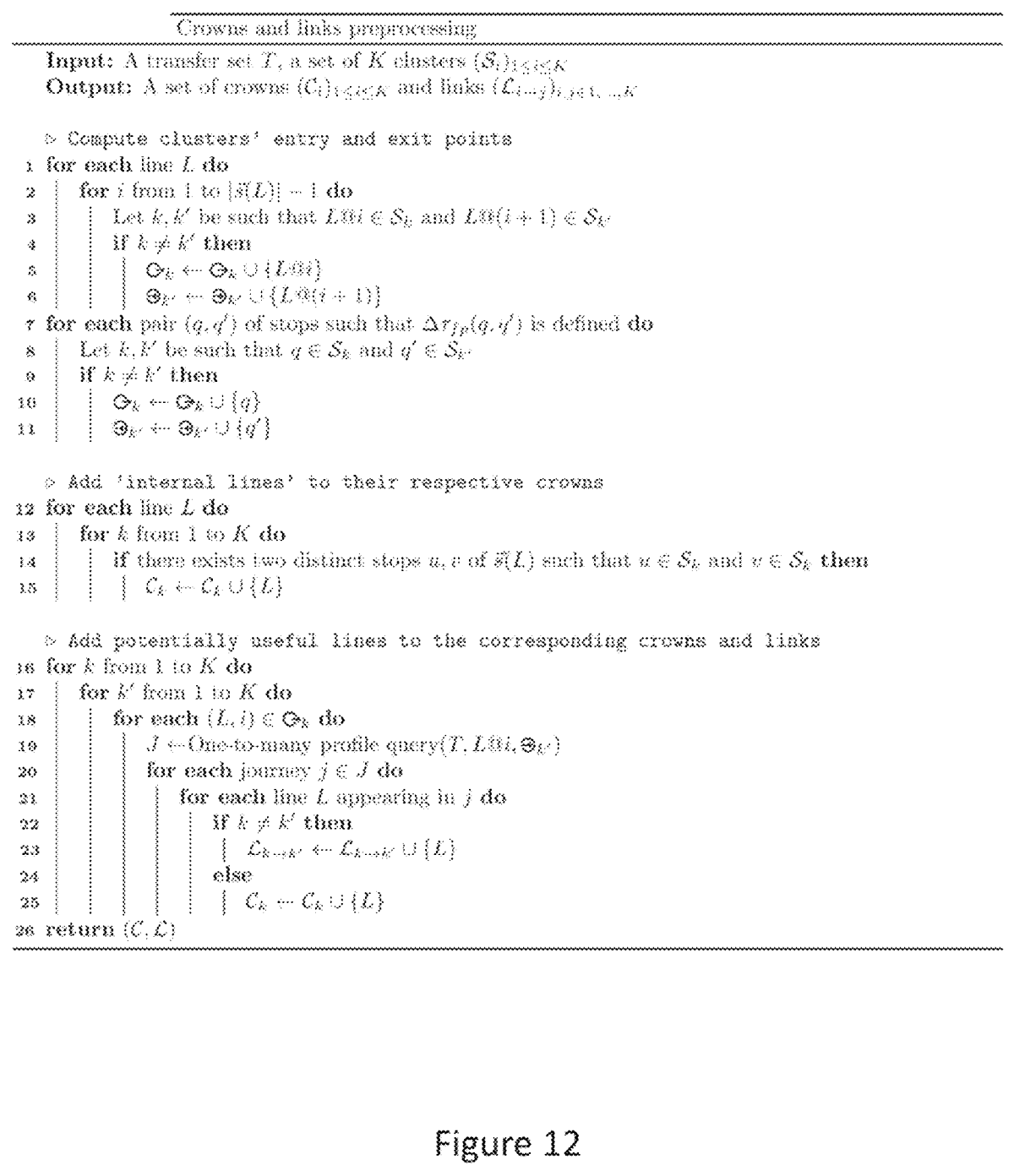

Crowns and links preprocessing

---

Input: A transfer set $T$, a set of $K$ clusters $(S_i)_{1 \leq i \leq K}$
Output: A set of crowns $(C_i)_{1 \leq i \leq K}$ and links $(\mathcal{L}_{i \to j})_{j \neq i, \ldots K}$ ▷ Compute clusters' entry and exit points
1  for each line $L$ do
2      for $i$ from 1 to $|\mathcal{S}(L)| - 1$ do
3          Let $k, k'$ be such that $L@i \in S_k$ and $L@(i+1) \in S_{k'}$
4          if $k \neq k'$ then
5              $\ominus_k \leftarrow \ominus_k \cup \{L@i\}$
6              $\oplus_{k'} \leftarrow \oplus_{k'} \cup \{L@(i+1)\}$
7  for each pair $(q, q')$ of stops such that $\Delta \tau_{fp}(q, q')$ is defined do
8      Let $k, k'$ be such that $q \in S_k$ and $q' \in S_{k'}$
9      if $k \neq k'$ then
10         $\ominus_k \leftarrow \ominus_k \cup \{q\}$
11         $\oplus_{k'} \leftarrow \oplus_{k'} \cup \{q'\}$ ▷ Add 'internal lines' to their respective crowns
12 for each line $L$ do
13     for $k$ from 1 to $K$ do
14         if there exists two distinct stops $u, v$ of $\mathcal{S}(L)$ such that $u \in S_k$ and $v \in S_k$ then
15             $C_k \leftarrow C_k \cup \{L\}$ ▷ Add potentially useful lines to the corresponding crowns and links
16 for $k$ from 1 to $K$ do
17     for $k'$ from 1 to $K$ do
18         for each $(L, i) \in \ominus_k$ do
19             $J \leftarrow$ One-to-many profile query$(T, L@i, \oplus_{k'})$
20             for each journey $j \in J$ do
21                 for each line $L$ appearing in $j$ do
22                     if $k \neq k'$ then
23                       $\mathcal{L}_{k \to k'} \leftarrow \mathcal{L}_{k \to k'} \cup \{L\}$
24                 else
25                     $C_k \leftarrow C_k \cup \{L\}$
26 return $(C, \mathcal{L})$

One-to-many profile query

Input: transfer set $T$, source stop $p_{src}$, target stops $p_{tgt}^1, p_{tgt}^2, \ldots, p_{tgt}^K$
Input: Departure time range $[T_{min}, T_{max}]$
Output: Result set $J$ 1  $J \leftarrow \emptyset$
2  $\mathscr{S} \leftarrow \emptyset$
3  $Q_n \leftarrow \emptyset$ for all $n = 1, 2, \ldots$
4  $\tau_{min}^{n,k} \leftarrow +\infty$ for all $k \in \{1, \ldots, K\}$, for all $n = 1, 2, \ldots$
5  $R_n(t) \leftarrow +\infty$ for all trips $t$, for all $n = 1, 2, \ldots$ 6  for $k$ from 1 to $K$ do
7   for each stop $q$ such that $\Delta\tau_{fp}(q, p_{tgt}^k)$ is defined do
8    for each $(L, i) \in L(q)$ do
9     $\mathscr{S} \leftarrow \mathscr{S} \cup \{(L, i, \Delta\tau_{fp}(q, p_{tgt}^k), k)\}$ 10 for $\tau$ from $T_{max}$ to $T_{min}$ do
11  $n \leftarrow 0$
12  for each stop $q$ such that $\Delta\tau_{fp}(p_{src}, q)$ is defined do
13   for each $(L, i) \in L(q)$ do
14    $t \leftarrow$ earliest trip of $L$ such that $\tau + \Delta\tau_{fp}(p_{src}, q) \leq \tau_{dep}(t, i)$
15    ENQUEUE$(t, i, 0)$
16  while $Q_n \neq \emptyset$ do
17   for each $p_t^b \rightarrow p_t^i \in Q_n$ do
18    for each $(L, i, \Delta\tau, k) \in \mathscr{S}$ with $b < i$ and $\tau_{arr}(t, i) + \Delta\tau < \tau_{min}^{n,k}$ do
19     $\tau_{min}^{m,k} \leftarrow \tau_{arr}(t, i) + \Delta\tau$ for all $m \geq n$
20     $J \leftarrow J \cup \{(\tau_{min}^{n,k}, n, k)\}$ and remove dominated entries
21    If $\tau_{arr}(t, b+1) < \tau_{min}^{n+1,k}$ then
22     for each transfer $p_t^i \rightarrow p_u^j \in T$ with $b < i \leq e$ do
23      ENQUEUE$(u, j, n+1)$
24   $n \leftarrow n + 1$
25 return $J$ 1  procedure ENQUEUE(*trip* $t$, *index* $i$, *number of transfers* $n$)
2   If $i < R_n(t)$ then
3    $Q_n \leftarrow Q_n \cup \{p_t^i \rightarrow p_t^{R_n(t)}\}$
4    for each trip $u$ such that $L(t) = L(u)$ and $t \preceq u$ do
5     $R_m(u) \leftarrow \min(R_m(u), i)$ for all $m \geq n$

Figure 13

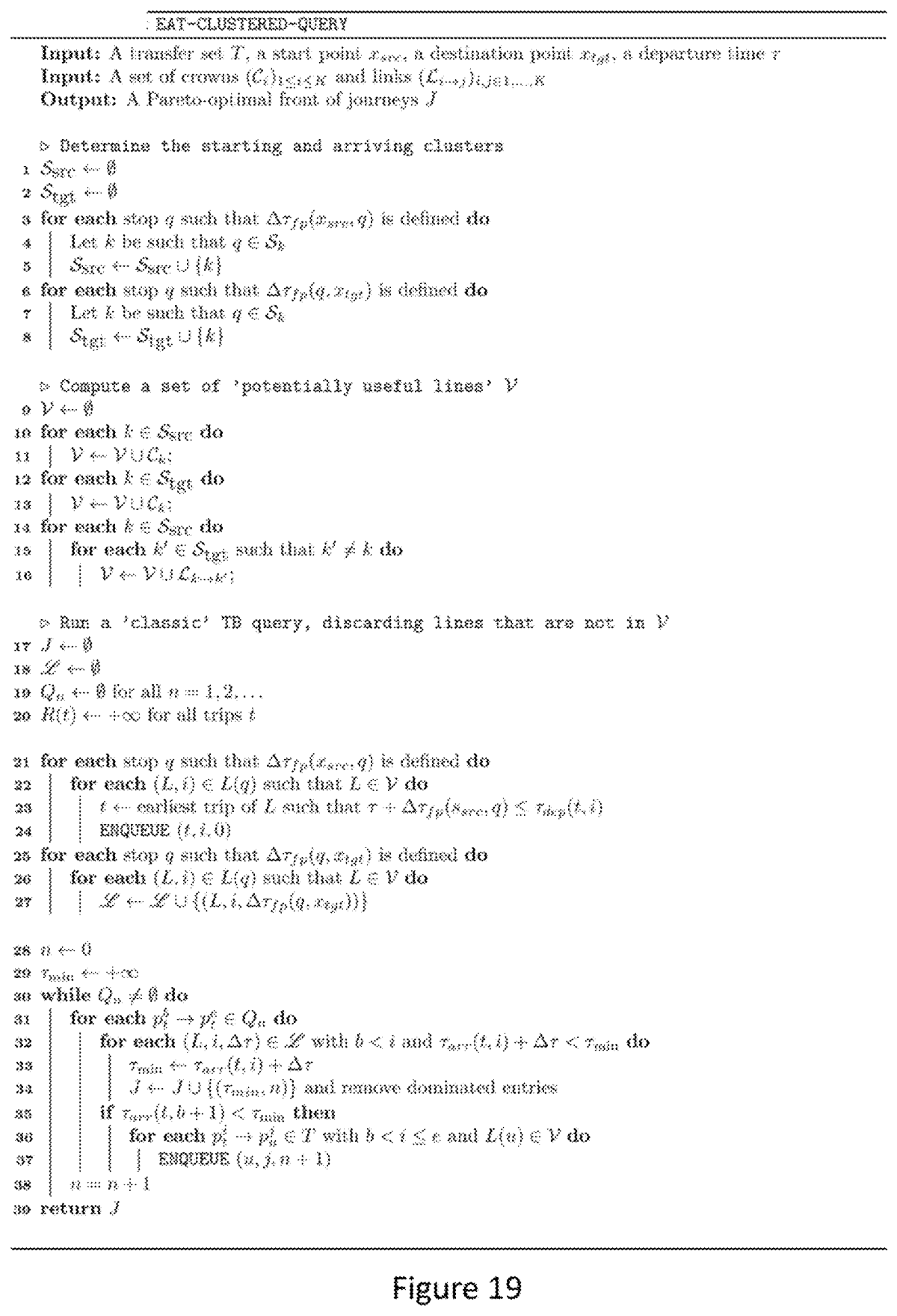

EAT–CLUSTERED–QUERY

Input: A transfer set $T$, a start point $x_{src}$, a destination point $x_{tgt}$, a departure time $\tau$
Input: A set of crowns $(C_i)_{1 \leq i \leq \kappa}$ and links $(\mathcal{L}_{i \to j})_{i,j \in 1,\ldots,\kappa}$
Output: A Pareto-optimal front of journeys $J$ ▷ Determine the starting and arriving clusters
1  $S_{src} \leftarrow \emptyset$
2  $S_{tgt} \leftarrow \emptyset$
3  for each stop $q$ such that $\Delta\tau_{fp}(x_{src}, q)$ is defined do
4      Let $k$ be such that $q \in S_k$
5      $S_{src} \leftarrow S_{src} \cup \{k\}$
6  for each stop $q$ such that $\Delta\tau_{fp}(q, x_{tgt})$ is defined do
7      Let $k$ be such that $q \in S_k$
8      $S_{tgt} \leftarrow S_{tgt} \cup \{k\}$ ▷ Compute a set of 'potentially useful lines' $\mathcal{V}$
9  $\mathcal{V} \leftarrow \emptyset$
10 for each $k \in S_{src}$ do
11     $\mathcal{V} \leftarrow \mathcal{V} \cup C_k$;
12 for each $k \in S_{tgt}$ do
13     $\mathcal{V} \leftarrow \mathcal{V} \cup C_k$;
14 for each $k \in S_{src}$ do
15     for each $k' \in S_{tgt}$ such that $k' \neq k$ do
16        $\mathcal{V} \leftarrow \mathcal{V} \cup \mathcal{L}_{k \to k'}$;

▷ Run a 'classic' TB query, discarding lines that are not in $\mathcal{V}$
17 $J \leftarrow \emptyset$
18 $\mathscr{L} \leftarrow \emptyset$
19 $Q_n \leftarrow \emptyset$ for all $n = 1, 2, \ldots$
20 $R(t) \leftarrow +\infty$ for all trips $t$ 21 for each stop $q$ such that $\Delta\tau_{fp}(x_{src}, q)$ is defined do
22     for each $(L, i) \in L(q)$ such that $L \in \mathcal{V}$ do
23        $t \leftarrow$ earliest trip of $L$ such that $\tau + \Delta\tau_{fp}(x_{src}, q) \leq \tau_{dep}(t, i)$
24        ENQUEUE $(t, i, 0)$
25 for each stop $q$ such that $\Delta\tau_{fp}(q, x_{tgt})$ is defined do
26     for each $(L, i) \in L(q)$ such that $L \in \mathcal{V}$ do
27        $\mathscr{L} \leftarrow \mathscr{L} \cup \{(L, i, \Delta\tau_{fp}(q, x_{tgt}))\}$ 28 $n \leftarrow 0$
29 $\tau_{min} \leftarrow +\infty$
30 while $Q_n \neq \emptyset$ do
31     for each $p_b^t \to p_e^t \in Q_n$ do
32        for each $(L, i, \Delta\tau) \in \mathscr{L}$ with $b < i$ and $\tau_{arr}(t, i) + \Delta\tau < \tau_{min}$ do
33           $\tau_{min} \leftarrow \tau_{arr}(t, i) + \Delta\tau$
34           $J \leftarrow J \cup \{(\tau_{min}, n)\}$ and remove dominated entries
35        if $\tau_{arr}(t, b+1) < \tau_{min}$ then
36           for each $p_b^t \to p_e^u \in T$ with $b < i \leq e$ and $L(u) \in \mathcal{V}$ do
37              ENQUEUE $(u, j, n+1)$
38     $n = n + 1$
39 return $J$

Figure 19

| Algorithm | Swiss network (8 clusters) | | |
|---|---|---|---|
| | running time (s) | biggest clust size | border stops ratio |
| Hierarchical (ward) | 380 | 6939 | 2.1% |
| DBSCAN | 17 | 29470 | 3.4% |
| METIS (dummy graph) | 22 | 3805 | 6.5% |
| METIS (dummy graph + regroup) | 22 | 4621 | 4.3% |
| METIS (stops graph) | 32 | 3804 | 4.1% |
| METIS (stops graph + regroup) | 33 | 4731 | 3.0% |
| METIS (routes graph) | 47 | 3803 | 6.7% |
| METIS (routes graph + regroup) | 47 | 5022 | 5.3% |

Figure 20

METHOD FOR COMPUTING A SET OF ITINERARIES FROM A DEPARTURE LOCATION TO AN ARRIVAL LOCATION USING CLUSTER-BASED SEARCHING

PRIORITY INFORMATION

The present application claims priority, under 35 USC § 119(e), from U.S. Provisional Patent Application, Ser. No. 63/291,632, filed on Dec. 20, 2021. The entire content of U.S. Provisional Patent Application, Ser. No. 63/291,632, filed on Dec. 20, 2021, is hereby incorporated by reference.

The present application claims priority, under 35 USC § 119(e), from U.S. Provisional Patent Application, Ser. No. 63/294,183, filed on Dec. 28, 2021. The entire content of U.S. Provisional Patent Application, Ser. No. 63/294,183, filed on Dec. 28, 2021, is hereby incorporated by reference.

BACKGROUND

A journey planner (also called trip planner) is a solver used to determine an itinerary from an origin location (the origin) to an arrival location (the destination), using one or more transport modes, in particular public transportation modes (subway, tram, bus, etc.—the planner is said to be "multimodal" when covering several transportation modes and allowing intermodal transfers from one mode to another). Searches may be optimized on different criteria, for example fastest, shortest, least changes, cheapest. Searches may be constrained for example to leave or arrive at a certain time, to avoid certain waypoints, etc.

Public transport modes generally operate according to published schedules, given that public transport services only depart at specific times (unlike private modes of transportation such as driving, walking, or cycling, which may leave at any time), an algorithm must therefore not only find a path to a destination, but seek to optimize it so as to minimize the arrival time in this time-dependent setting.

In mobility applications or websites, finding possible paths between an origin and a destination is a classical problem. One algorithm used to this end is the "Trip-Based Public Transit Routing" algorithm, which is a method based on iterations, similar to breadth-first search in a graph, where one iteration corresponds to taking a trip. It is disclosed in the document Sacha Witt. "Trip-based public transit routing." In N. Bansal and I. Finocchi, editors, ESA 2015, volume 9294 of Lecture Notes in Computer Science, Berlin, Heidelberg, 2015. Springer.

The Trip-Based Public Transit Routing algorithm is an algorithm for computing a Pareto front and a solution with this value for each element in the Pareto front for two criteria in multimodal networks restricted to transit and walking between stations, considering an origin, a destination, and a start time. In the Trip-Based Public Transit Routing algorithm, the criteria, minimum arrival time (i.e., the earliest arrival time considering the start time) and minimum transfer number (i.e., the minimum number of changes of vehicle or transport mode, either within the same network or intermodally), are optimized.

If a set of criteria $(c_1, c_2, \ldots, c_n)$ is to be minimized, a n-tuple $(v_1, v_2, \ldots, v_n)$ of values for those criteria is non-dominated in the Pareto sense if there is no other n-tuple $(v'_1, v'_2, \ldots, v'_n)$ such that for all $i \in \{1, 2, \ldots, n\}$, $v'_i \leq v_i$ and $\exists i \in \{1, 2, \ldots, n\}$ such that $v'_i < v_i$. The set of non-dominated criterion values of feasible paths is called Pareto front. An optimal path, in the Pareto sense, for minimum arrival time and minimum number of transfers is hence a path whose values belong to the Pareto front for those criteria. The Trip-Based Public Transit Routing algorithm builds the Pareto front for minimum arrival time and minimum number of transfers and returns one optimal itinerary with this value for each element in the Pareto front in polynomial time.

The Trip-Based Public Transit Routing algorithm is based on the preprocessing and pruning of the feasible transfers between trips. The aim is to build for each trip a neighborhood of reachable trips in such way that when searching this graph structure, the Pareto front can be obtained.

An earliest arrival time query then consists in a breadth-first search like exploration in a time-independent network where the trips are vertices and the possible transfers the arcs.

This graph representation of the transportation network is illustrated in FIG. 2.

The Trip-Based Public Transit Routing algorithm can also cover profile queries, where all the optimal paths must be found for a given starting time range.

FIG. 2 illustrates the modeling of the network in the Trip-Based Public Transit Routing algorithm search phase. Public transit information is represented using a graph, whose vertices (or nodes) are the trips of the public transit network and whose arcs represent the possibility to transfer between two trips at given stops. FIG. 2 illustrates the modeling of a transfer 15 between a first trip 10 of a public transit network at station (stop) (i) and a second trip 20 of the public transit network at station (stop) (j). FIG. 2 further illustrates a second transfer 25 between the first trip 10 of the public transit network at station (stop) (u) and a third trip 30 of the public transit network at station (stop) (v). As illustrated in FIG. 2, node 11 corresponds to trip 10, node 21 corresponds to trip 20, and node 31 corresponds to trip 30. A trip, in the Trip-Based Public Transit Routing algorithm, is an ordered list of arrival and departure times at stops/ stations that will be fulfilled by a single vehicle. The trip, in the Trip-Based Public Transit Routing algorithm, corresponds to taking one vehicle of a line. A line is an ordered set of trips sharing the same sequence of stops visited by the vehicles corresponding to the trips and where trips do not overtake one another (the order of the arrival and departure times of the trip is the same for all the stops of the line).

As illustrated in FIG. 2, transfer 15 corresponds to arc 17 and transfer 25 corresponds to arc 27. It is noted that several feasible transfers are often possible between two trips. A transfer to a public transit vehicle at a given stop is feasible if this stop is reached before the vehicle departs.

FIG. 3 illustrates a trip-based public transit routing process that utilizes a database or data structure 50 containing public transit routing information for a particular area, such as a city. A preprocessing process module 51 constructs a set of feasible transfers between trips in the public transit network.

As illustrated in FIG. 3, the results 53 of a pruning process, performed by preprocessing process module 51, is a set of pruned feasible transfers between trips in the public transit network. The preprocessing/pruning of the feasible transfers between trips build, for each trip, a neighborhood of reachable trips that will be smaller than the complete neighborhood. For the algorithm to be correct, for each element in the Pareto front, there should be at least one solution in the Pareto set with this value such that all the transfers of this solution belong to the set. The set of pruned feasible transfers between trips in the public transit network (53) ensures the correction.

A search engine module 57 finds the Pareto front and one solution per element in the Pareto front 59 by performing an earliest arrival time query that consists in a breadth-first search like exploration in a time-independent network where the trips are the nodes of FIG. 2 and the possible transfers are the arcs of FIG. 2. So, for each iteration, one additional trip is taken in each solution to try and get to destination.

Lastly, as illustrated in FIG. 3, a user is enabled to define parameters 55. The parameters include origin, destination, and start time or time range.

In the conventional systems, the computation time to determine the itineraries can be long due to the large number of lines that must be processed to determine the feasible itineraries.

Therefore, it is desirable to provide a process that reduces a computation time by partitioning a set of stops in a multimodal transportation network to form clusters of stops; processing each cluster to determine a crown, which is a set of lines that form part of at least one Pareto-optimal journey for any origin-destination within the cluster; and processing each cluster to determine a link with each cluster, which is a set of lines that form part of at least one Pareto-optimal journey from some stop in a cluster to some stop in another cluster.

Moreover, it is desirable to provide a process that reduces a computation time by restricting a query search to a subgraph given by an origin cluster's crown, a destination cluster's crown, and the link from the origin cluster to the destination cluster.

Furthermore, it is desirable to provide a process that reduces a computation time by partitioning a set of stops in a multimodal transportation network to form clusters of stops; processing each cluster to determine a crown, which is a set of lines that form part of at least one Pareto-optimal journey for any origin-destination within the cluster; processing each cluster to determine a link with each cluster, which is a set of lines that form part of at least one Pareto-optimal journey from some stop in a cluster to some stop in another cluster; and restricting a query search to a subgraph given by an origin cluster's crown, a destination cluster's crown and the link from the origin cluster to the destination cluster.

Additionally, it is desirable to provide a process that reduces a computation time by partitioning a set of stops in a multimodal transportation network to form clusters of stops; processing each cluster to determine a crown, which is a set of lines or trips that form part of at least one Pareto-optimal journey for any origin-destination within the cluster; processing each cluster to determine a link with each other cluster, which is a set of lines or trips that form part of at least one Pareto-optimal journey from some stop in a cluster to some stop in another cluster; and restricting a query search to a subgraph given by origin clusters' crowns, destination clusters' crowns and the links from each origin cluster to each destination cluster.

BRIEF DESCRIPTION OF THE DRAWINGS

The drawings are only for purposes of illustrating various embodiments and are not to be construed as limiting, wherein:

FIG. 6 illustrates an algorithmic example of preprocessing a set of feasible transfers using arrival time-based pruning;

FIG. 7 illustrates another algorithmic example of building and preprocessing a set of feasible transfers using line-based pruning;

FIG. 8 illustrates a conventional algorithmic example of an earliest arrival time query in a public transit network with a data model where trips are represented as nodes and feasible transfers are represented as arcs;

FIG. 12 illustrates an algorithmic example to determine crowns and links for a given clustering of the stops;

FIG. 13 illustrates an algorithmic example to perform a profile query from an origin to a set of destinations instead of one, and to return for each destination a complete set of Pareto-optimal journeys;

FIG. 19 illustrates an algorithmic example of a cluster based search phase;

FIG. 20 illustrates a table showing comparison between the partitioning and clustering algorithms;

DETAILED DESCRIPTION OF THE DRAWINGS

Figure 1:
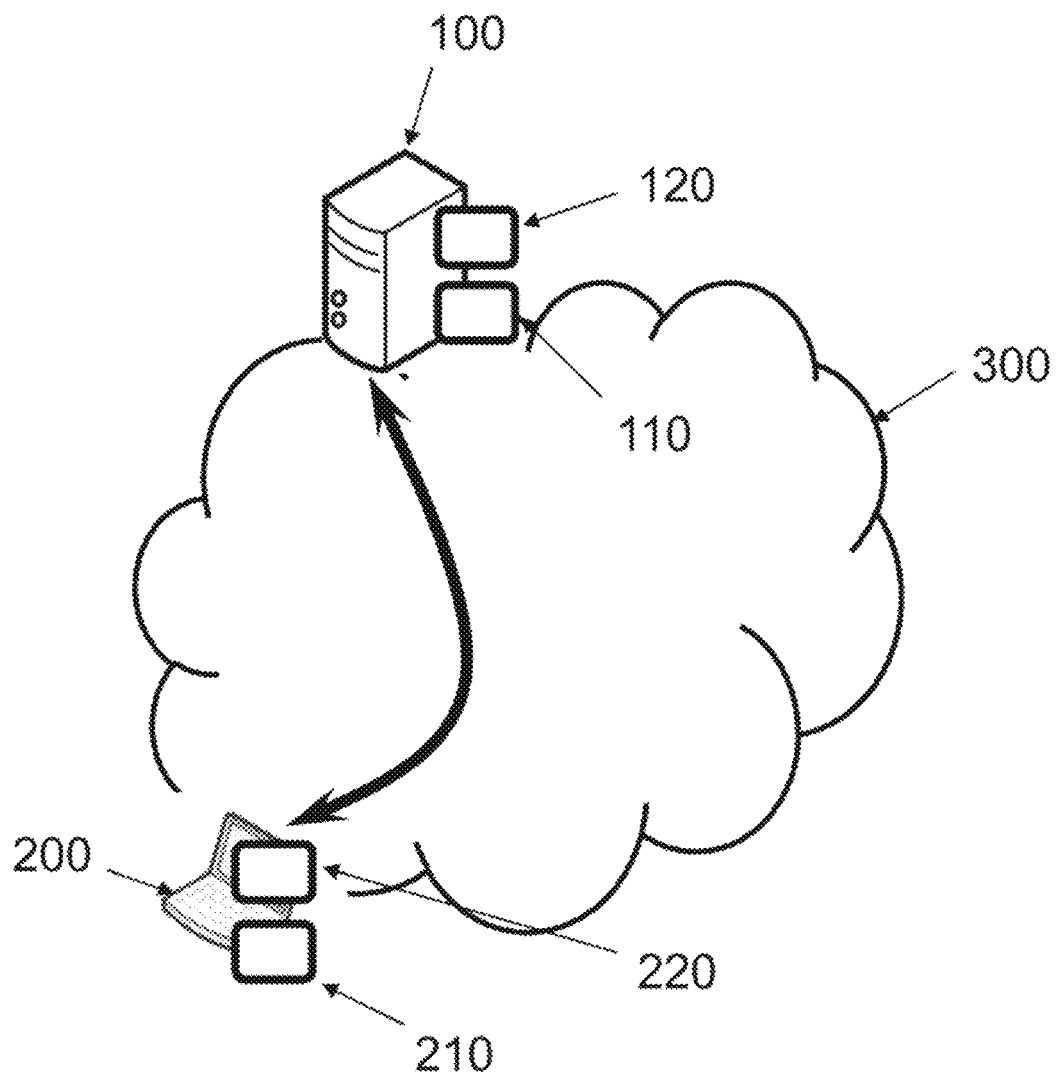
FIG. 1 illustrates an example of architecture in which the methods described below are performed.
Figure 2:
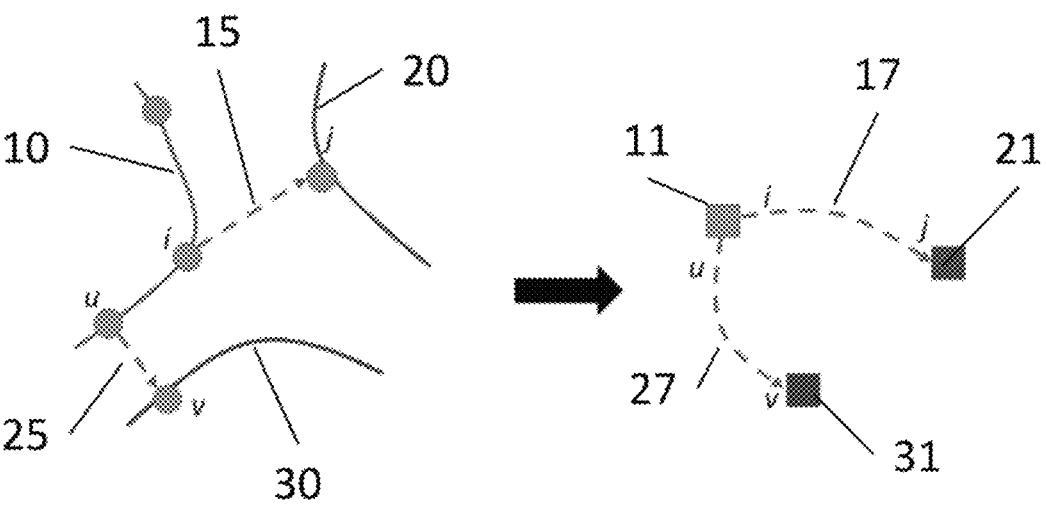
FIG. 2 illustrates a data model for public transit networks where trips are represented as nodes and feasible transfers are represented as arcs.
Figure 3:
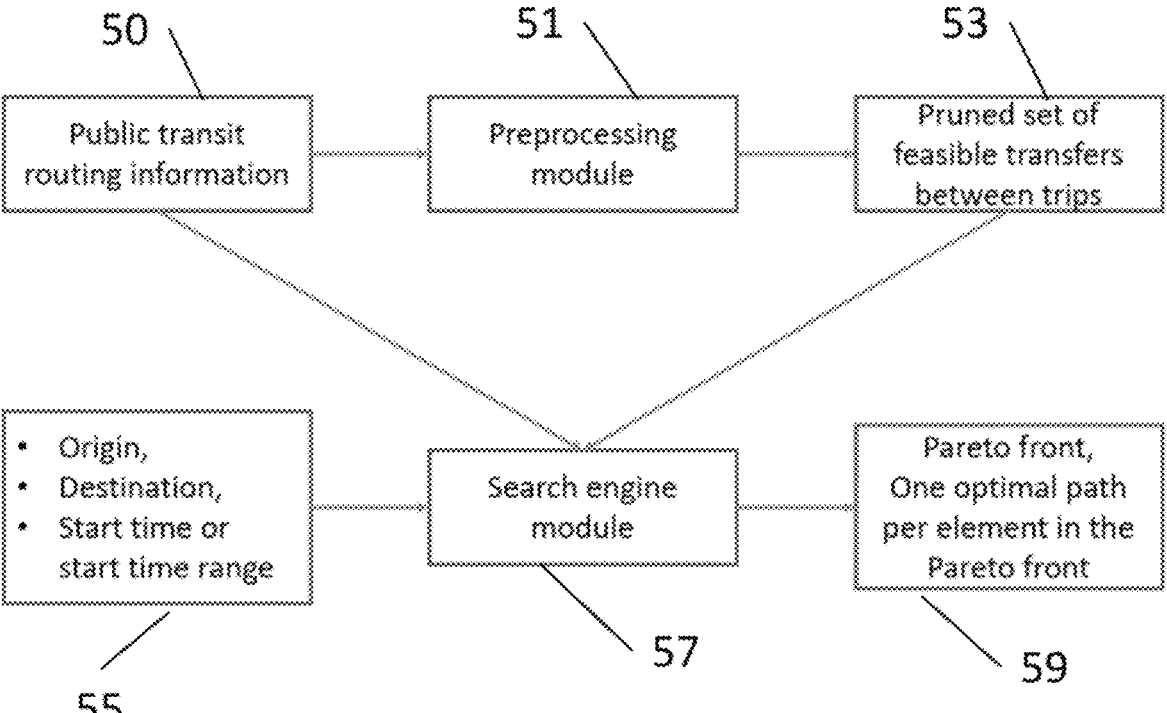
FIG. 3 illustrates a block diagram of a public transit routing process based on feasible transfers preprocessing.
Figure 4:
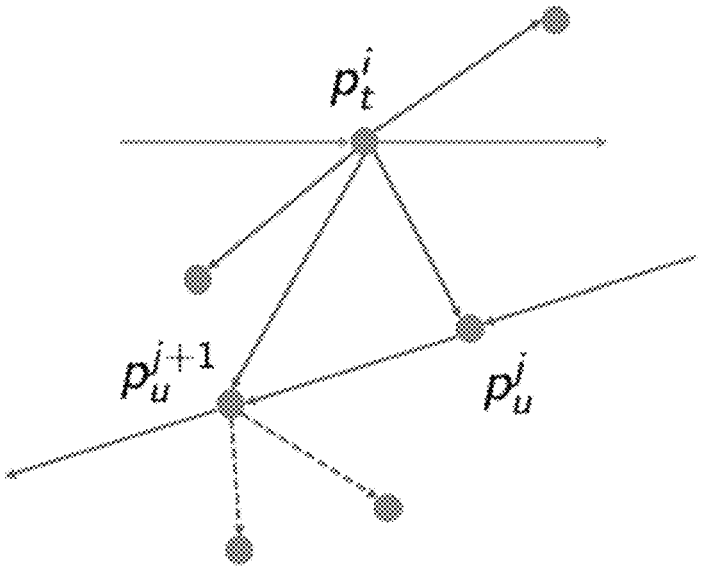
FIG. 4 is a graphical representation illustrating stops that can be reached by walking from a current stop or from the stops reached after a transfer.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

A method for computing at least one itinerary, when at least one itinerary is feasible, from a departure location to an arrival location will be described below.

In the description below, the departure and arrival locations are geographical locations, typically locations on a map as defined by an address, a point of interest, coordinates, etc.

In the description below, the determined itineraries are preferably the optimal ones (or at least close to the optimal ones; i.e., approximations of the optimal ones) according to at least one criterion such as the arrival time (which should be the earlier), the duration of the itinerary (which should be the lowest), the departure time (which should be the latest), the length of the itinerary (which should be the shortest), the number of transfers (which should be the lowest), the price (which should be the lowest), etc.

Generally speaking, a "cost" of the itinerary can be computed according to a given cost function, the cost being minimized and possibly multidimensional.

In a preferred example of the Trip-Based Public Transit Routing algorithm that will be detailed in the following description, two criteria are co-considered: (1) arrival time and (2) the number of transfers.

In earliest arrival time queries, a minimum departure time is provided by the user while in the profile queries a time range for departure is given by the user. In this later case, the Pareto front is built for three criteria: the departure time (which must be maximized) is added to earliest arrival time and minimum number of transfers.

Furthermore, each itinerary is a displacement associated with a multimodal transportation network of predetermined stations. The multimodal transportation network is preferably a network of public transportation modes, in particular "scheduled" transportation modes; i.e., following a line (a predetermined sequence of stations) and of which timetables are known.

Examples of scheduled public transportation modes include bus, metro, tramway, train, water shuttle, carpooling, etc. It is to be noted that the multimodal transportation network might further comprise non-scheduled transportation modes such as on-demand bus, ride-hailing, or even bike sharing (wherein the users can simply take a bike for going from a station to another without any restriction), but advantageously only walking and scheduled public transportation modes are hereby involved in the multimodal transportation network.

By station, or "stop," it is meant a facility at a given location wherein at least one of the transportation modes of the multimodal transportation network regularly stops to load or unload passengers, for example a bus station, a metro station, a train station, etc.

A travel between two consecutive stations during a trip is called "connection." It is associated with a departure time from the first stop and an arrival time at the second stop.

A trip is a set of ordered arrival/departure times at stations/stops for a single vehicle.

A transfer corresponds to leaving one trip at its $i^{th}$ stop and taking (starting) a second trip at its $j^{th}$ stop.

In the following description, the multimodal network is restricted to a public transit network and walking between stations, wherein a transfer is walking between stations.

The method, described below, may be implemented within an architecture such as illustrated in FIG. 1, by means of a server 100 and/or a client 200.

Each of these devices 100, 200 are typically connected to an extended network 300 such as the Internet for data exchange. Each one comprises data processors 110, 210, and optionally memory 120, 220 such as a hard disk.

More precisely, the user generally uses a client device 200 of the smartphone type, for inputting a request for itineraries (are inputted the departure location, the arrival location, and a departure time or range thereof or an arrival time or range thereof). The request may be either directly processed by the client 200, or transmitted to the server 100 for being processed there. The described methodology is not limited to any specific implementation.

It is to be noted that even if the method is performed by the client device 200, the server 100 can still be called for performing any of the subroutines.

In the description below, the following notation will be utilized.

t@i represents the pair (t, J) where t is a trip and i is an index in its stop sequence; i.e., t@i represents the $i^{th}$ stop of trip t. If several identical stops in the sequence (i.e. the trip return at a previously visited stop), t@i refers to the one in the $i^{th}$ position, that is the index of the stop is also referenced in the notation.

$\vec{p}(t)=(t@0, t@1, \ldots)$ is the stop sequence of trip t.

$\tau_{arr}(t, i)$ is the arrival time and $\tau_{dep}(t, i)$ is the corresponding departure time at t@i of trip t.

More specifically, a sequence of stops $\vec{p}(t)=(t@0, t@1, \ldots)$ is associated with each trip t. The schedule of t is defined by the arrival and departure times of t at the stops of its sequence. $\tau_{arr}(t, i)$ is the arrival time of t at the $i^{th}$ stop of $\vec{p}(t)$, and $\tau_{dep}(t, i)$ is the departure time of t at the $i^{th}$ stop of $\vec{p}(t)$. Trips are grouped into lines that do not exactly represent the routes of the public transport network. First, all the trips of a line L have exactly the same sequence of stops, denoted $\vec{p}(L)=(L@0, L@1, \ldots)$. Second all the trips of a line are completely ordered following comparison relations and ≤defined < for two trips having the same sequence:

$$t \leq u \Leftrightarrow \forall i \in [0, |\vec{p}(t)|), \tau_{arr}(t,i) \leq \tau_{arr}(u,i)$$

and $$t < u \Leftrightarrow t \leq u \text{ and } \exists i \in [0, |\vec{p}(t)|), \tau_{arr}(t,i) < \tau_{arr}(u,i)$$

For a given stop s, L(s) is defined as the set of all pairs (L, i), wherein L is a line and i is an index in the sequence of L such that s=L@i. A displacement between the $i^{th}$ stop of t and the $j^{th}$ stop of t using trip t is denoted t@i→t@j, and similarly, a transfer between trip t at the $i^{th}$ station and trip u at the $j^{th}$ station is denoted t@i→u@j. Walking transfer times are defined for any pair of stops (p,q), p≠q that are close enough of one another and the associated duration is $\Delta\tau_{fp}(p,q)$. When transferring between two trips at a given station (t@i=u@j=p), a minimum change time $\Delta\tau_{fp}(p,p)$ can be defined, to represent the time needed to move within this station.

A line L is an ordered set of trips $t_0, t_1, t_2, \ldots$, such that all trips of the line have the same stop sequence (denoted $\vec{p}(L)$) and do not overtake one another.

A transfer t@i→u@j is feasible if and only if $\Delta\tau_{fp}(t@i, u@j)$ is defined and $$\tau_{arr}(t,i) + \Delta\tau_{fp}(t@i, u@j) \leq \tau_{dep}(u,j)$$

T is the set of all feasible transfers.

The set of feasible transfers for a trip t contains all transfers from the $i^{th}$ stop, t@i, of trip t to the $j^{th}$ stop, u@j, of trip u such that a user can reach stop u@j on time to get trip u after alighting t at stop t@i.

Using the data representation disclosed in the document by Sacha Witt, "Trip-based public transit routing," In N. Bansal and I. Finocchi, editors, ESA 2015, volume 9294 of Lecture Notes in Computer Science, Berlin, Heidelberg, 2015 Springer, it is possible to represent the public transit routing information by a graph where each node corresponds to a trip and each arc correspond to a feasible transfer. Graph exploration methods can then be adapted to take into account the specific arc features of that graph and applied on that graph in order to build itineraries in the public transit network.

Although the above defined set of feasible transfers is correct for any criterion given a fixed transfer speed, using the complete set of feasible transfers between trips during the search phase would not be beneficial because the above defined set of feasible transfers would be large and the non-useful arcs would negatively impact the exploration time (and hence the query time).

When optimizing arrival time, given an origin trip and alighting stop index in its sequence and given a destination line and a boarding stop index in its sequence, it is always at least as good to take the earliest possible trip of the destination line. Advantageously, it is hence possible to keep only the transfer to the earliest trip of the destination line such that the transfer is feasible in the set T and to remove all later transfers.

One approach to diminish further the negative impact on the query times of the size of the feasible transfer set T is to prune the set of feasible transfers while keeping enough transfers to compute at least one optimal path per value in the Pareto front.

An example of an arrival time based pruning method, as proposed by Sacha Witt in "Trip-based public transit routing," for preprocessing a set of feasible transfers is illustrated in FIG. 6.

In the description below, an arrival time based pruning method is any method for pruning a set of feasible transfers based on comparing arrival times at stations and/or change times at stations (minimum time at which it will be possible to take a new trip) given that at most one transfer is performed between origin and destination.

As shown in the example of arrival time pruning method in FIG. 6, each trip t is processed in turn, and each stop i of its sequence, starting by the last one. The process determines if taking a neighboring trip u at stop j, leaving t at stop i, can improve the arrival ($\tau_A$) or change ($\tau_C$) times at any stop of the network, compared to the previous transfers processed.

Figure 5:
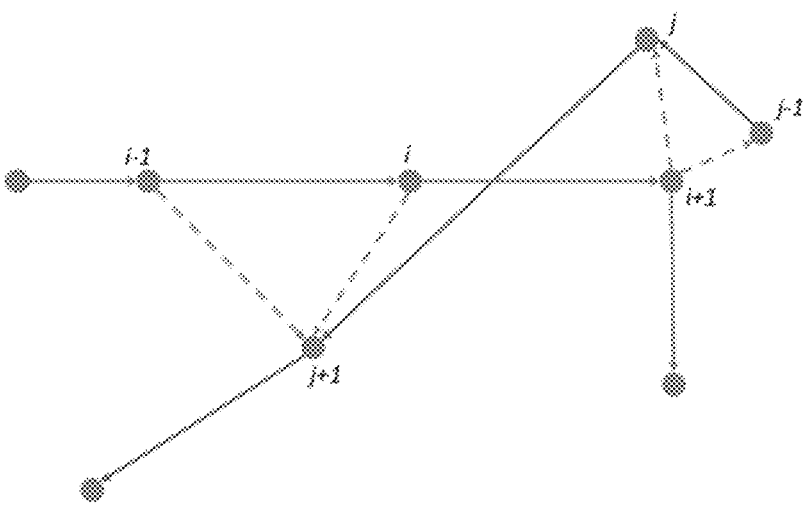
FIG. 5 is a graphical representation illustrating transfers between two lines.

FIG. 5 represents possible transfers between two trips u 70 and v 71. The possible transfers are transfer 83 from stops u@(i−1) 63 to stops v@(j+1) 65, transfer 82 from stop u@i 64, to stop v@(j+1) 65, transfer 81 from stop u@(i+1) 60 to stops v@j 62 and transfer 80 from stop u@(i+1) 60 to stop v@(j−1) 61. The transfers are processed in the following order: 80, 81, 82, 83.

If leaving t at stop i and taking u at stop j can improve the arrival ($\tau_A$) or change ($\tau_C$) time at any stop of the network, the transfer is kept.

If leaving t at stop i and taking trip u at stop j cannot improve the arrival ($\tau_A$) or change ($\tau_C$) times at any stop of the network, the transfer is dropped because either the transfer cannot be part of any optimal solution or taking a later transfer or transferring to another trip will lead to at least as good arrival and/or change times.

The above pruning method reduces the query times, which in turns reduces the time needed to provide the user with a set of possible itineraries.

If the number of transfers in the built set of feasible transfers is reduced, the processing time in the search phase is reduced. For example, the preprocessing step, described in FIG. 6, reduces the transfer set in way that ensures that for each element in the Pareto front for minimizing arrival time and number of transfers, at least one solution with this value can be constructed using transfers from the reduced set. However, the preprocessing phase for the process illustrated in FIG. 6 is costly because computing all the possible arrival and change times for all the reachable stops for each transfer is costly (in terms of execution times). Hence, applying another faster pruning phase, as discussed below, that removes some transfers before applying pruning of FIG. 6 can reduce the preprocessing computation times.

An example of a line-based transfer set building and pruning is disclosed in co-pending U.S. patent application Ser. No. 16/853,914, and illustrated in FIG. 7. The entire content of U.S. patent application Ser. No. 16/853,914 is hereby incorporated by reference.

Similarly to transfers between trips, it is possible to define possible transfers between lines. In that case, trip departure times are not considered, but only the definition of transfer duration between stops of the lines, i.e. $\exists (i,j) \in$ $[1 \ldots |\vec{p}(L)|-1] \times [0 \ldots |\vec{p}(L')|-2]$, $\Delta\tau_{fp}(L@i, L'@j)$ is defined.

It is noted that a transfer is not performed from the first stop of a trip or to the last stop of a trip.

In particular, in the algorithm of FIG. 7, in procedure LINE_TRANSFERS, all the transfers from line to line are generated and a transfer from line L at its $i^{th}$ stop to line L' at its $j^{th}$ stop is saved with using the triplet (i, L'@j, $\Delta\tau_{fp}(L@i, L'@j)$). Those transfers are then advantageously sorted by target line, decreasing origin line index and increasing target line index. Any sorting can then be used to break ties.

In its pruning phase, the algorithm illustrated in FIG. 7 considers each pair (origin trip, target line) and prune the corresponding transfers. The pruning is based on a Pareto dominance relation between transfers t@i→u@j with the criteria: origin index i, which should be the highest, target line index j, which should be the lowest, destination trip u, which should be the lowest.

The obtained algorithm builds a correct set of transfers for the criteria to minimize arrival time and number of transfers. A correct set of transfers is such that for each value in the Pareto front, there is at least one solution in the Pareto set with this value such that all the transfers of this solution belong to the transfer set.

Other pruning processes that ensure the correction of the transfer set may include a process based upon line-based U-turn removal, and a process based upon two stops from the origin line enabling a transfer to the same stop of the target line.

In the first pruning process (line-based U-turn removal), if transfer (i, L'@j, $\Delta\tau_{fp}(L@i, L'@j)$) is defined for a line L, and L'@(j+1)=L@(i−1), transfer (i, L'@j, $\Delta\tau_{fp}(L@i, L'@j)$) can be removed from the set of feasible transfers if for all trip t of L, wherein t' is the earliest trip from L' that can be caught at j after $\tau_{arr}(t,j)+\Delta\tau_{fp}(L@i, L'@j)$, $$\tau_{arr}(t,i-1)+\Delta\tau_{fp}(L@(i-1),L'@(j+1)) < \tau_{arr}(t',j+1)$$

It is true if:

$$\tau_{arr}(t,i-1)+\Delta\tau_{fp}(L@(i-1),L'@(j+1)) < (\tau_{arr}(t',j+1)-\tau_{dep}$$
$$(t',j))+\tau_{arr}(t,i)+\Delta\tau_{fp}(L@i,L'@k)$$

The following condition is sufficient:

$$\Delta\tau_{fp}(L@(i-1), L'@(j+1)) < \min_{t\in L}\{\tau_{arr}(t, i) - \tau_{arr}(t, i-1)\} +$$

$$\min_{v\in L'}\{\tau_{arr}(t', j+1) - \tau_{dep}(t', j)\} + \Delta\tau_{fp}(L@i, L'@j)$$

The following condition is also sufficient and can be checked in a computationally efficient manner:

$$\Delta\tau_{fp}(L@(i-1),L'@(j+1))\leq\Delta\tau_{fp}(L@i,L'@j)$$

In the second pruning process, if transfers (i, L@j, $\Delta\tau_{fp}$ (L@i, L'@j)) and (k, L'@j, $\Delta\tau_{fp}$(L@k, L'@j)) are defined for a line L, with k>i, transferring from L@i rather than from L@k can be interesting only if transferring from L@i makes it possible to catch an earlier trip than transferring at L@k (otherwise, only the transfer from L@k is kept). For a given origin trip t of L, it will not be the case if $\tau_{arr}$(t,k)+$\Delta\tau_{fp}$(L@k, L'@j)≤$\tau_{arr}$(t,j)+$\Delta\tau_{fp}$(L@i, L'@j). Hence transfer (i, L'@j, $\Delta\tau_{fp}$(L@i, L'@j)) can be pruned if:

$$\max_{t\in L}(\tau_{arr}(t, k) - \tau_{arr}(t, i)) + \Delta\tau_{fp}(L@k, L'@j) \leq \Delta\tau_{fp}(L@i, L'@j)$$

It is noted that more complicated pruning methods can be implemented based on maximum and minimum times between two stops of a line over the different trips, such as comparing transfers where both origin and destination indices are different.

As a second preprocessing step, the arrival time base transfer pruning, as discussed above with respect to FIG. 6, can be applied. Since the first preprocessing step of FIG. 7, has created an initial transfer set that is smaller, this second preprocessing step will be significantly less expensive computationally than with the complete transfer set and total preprocessing time is reduced.

Based on a correct transfer set and the associated search graph, routing algorithms can be designed to find the Pareto front and one solution with this value per element in the Pareto front for one or more criteria.

FIG. 8 illustrates the earliest arrival time query algorithm proposed in Sacha Witt, "Trip-based public transit routing," In N. Bansal and I. Finocchi, editors, ESA 2015, volume 9294 of Lecture Notes in Computer Science, Berlin, Heidelberg, 2015 Springer.

Earliest arrival time queries start with an initialization phase where the set of lines L from which the destination can be reached and the set of the earliest trips that can be reached from origin are computed.

$$\mathcal{F} = \{(L, i, 0)|(L, i) \in L(p_{tgt})\}$$

$$\bigcup\{(L, i, \Delta\tau_{fp}(q, p_{tgt}))|(L, i) \in L(q) \land q \text{ is a neighbor of } p_{tgt}\}$$

The lines of L will be the targets of the algorithm while the search queue is initialized with the earliest trip of each line reached from origin.

The index R(t) of the first reached stop of trip t, initialized to ∞ for all trips, is maintained. For each number of transfers, one queue $Q_n$ of trip segments reached after n transfers is defined.

$Q_0$ is initialized from the trips that can be taken from the source stop $p_{src}$. Given a start time T, for any stop q reached by walking from $p_{src}(\Delta\tau_{fp}(p_{src},q)$ is defined), the earliest trip of (L i)∈ L(q) is added to the queue. It is the smallest trip t of line L such that $$\tau_{dep}(t, i) \leq \begin{cases} \tau & \text{if } q = p_{src} \\ \tau + \Delta\tau_{fp}(p_{src}, q) & \text{otherwise} \end{cases}$$

Note that it is possible to consider an origin in the road network if duration between this origin and neighboring stations can be computed, for instance using a classical shortest path algorithm in the road network.

After the initialization, the process performs a breadth-first search like exploration. For each iteration, the process scans the trips in the queue. Each trip is scanned in turn. If the trip belongs to the target lines, the trip is compared to the current solution set. Then the transfers from this trip are added to the queue of the next iteration.

A more detailed description of this process is provided in FIG. 8.

Profile queries are also considered, where in addition to source and target stops, the user provides an earliest departure time $\tau_{edt}$ and a latest departure time $\tau_{ldt}$; i.e., an interval in which to depart. Maximum departure time is considered a third criterion in the Pareto search. The result of the query is the set of all the Pareto values for minimum arrival time, minimum number of transfers, and maximum departure time starting within the interval (and one itinerary per value The computation for profile queries is as follows: perform an earliest arrival time query starting at $\tau_{ldt}$ and add the Pareto values to the result set of the profile search. Then restart the search starting at the preceding instant without resetting the labels. By iterating the process, the Pareto front can be completed without performing unnecessary computations as the labels will only allow improvements on preceding arrival times.

As noted above, in the preprocessing process, feasible transfers are first computed, and then pruned with an arrival time based pruning in order to reduce the query times. Advantageously, instead of the transfer generation step proposed in the Trip-Based public transit routing algorithm, it is possible to extend the version disclosed in co-pending U.S. patent application Ser. No. 16/853,914, as illustrated in FIG. 7. The arrival time based pruning can then be applied or not, as the obtained feasible transfer set is already of reduced size.

Consider first the feasible transfer generation. Actually, in the standard version, not all the feasible transfers are generated. When considering transfer t@i→L'@j from a trip t to a line L'≠$L_t$, it is considered that the user will take the first trip of L' that will arrive after the user has reached stop L'@j. Hence only the transfer to that trip is added to the set of feasible transfers.

The preprocessing stage clusters the public transit network and computes relevant network parts when transiting between different clusters in order to prune the search at query time.

The processing phase is modified to use only a subset of the network, depending on the clusters associated to the origin and destination locations. If all belong to the same cluster, a local search is performed. If different clusters are involved, the search is performed using a restricted set of lines between the clusters.

The preprocessing and the corresponding search phase modifications can be applied to other routing algorithms with limited modifications, however, the following description is focused on the Trip Based Public Transit Routing algorithm The Trip Based Public Transit Routing algorithm computes itineraries in a graph where the vertices are trips from scheduled modes and an arc indicates that a transfer is feasible between two trips. It is explained below how to modify the search phase of this algorithm to take advantage of the proposed preprocessing. The resulting algorithm improves the query times in large public transit networks compared to the standard version. The results indicate that the cluster-based method can reduce local and long distance queries on the test networks.

The preprocessing and the corresponding search phase modifications concern routing in multimodal or public transit networks. In public transit networks, the user can combine public transit modes with walking between the stations to reach his/her destination. When the network is multimodal, or intermodal, it is possible to combine other modes with walking and public transit, such as bike sharing or carpooling. For a given origin and destination, the process returns to the user a set of feasible itineraries between the origin and the destination to choose from. In such networks, two classical criteria for path optimization are earliest arrival time and minimum number of transfers, as they have an important impact on a user's decision. In the discussion below, these criteria will be used to explain the method, but any set of criteria could be considered in this context In general, for any additive criterion to minimize and graph model of the network data, it is possible to construct graphs and select origin and destinations for which the number of optimal solutions will be exponential. However, for one criterion, there will be only one optimal value. In a multi-criteria context, the number of elements in the Pareto front is in general exponential for two or more additive criteria to minimize, but can be polynomial for specific settings. It is the case for earliest arrival time and minimum number of transfers. Indeed, the number of elements in the Pareto front is bounded by the number of trips, as the number of transfers is bounded by the number of trips.

This observation has led to considering only a complete set of solutions, that is, instead of aiming at constructing all the optimal solutions, returning only one solution with this value per element in the Pareto front.

Several algorithms have been proposed to optimize earliest arrival time and possibly minimum number of transfers in transit networks (with public transportation and walking). The RAPTOR and Connection Scan (CSA) algorithms use dynamic programming on the timetable data to compute complete solution sets. The Transfer Patterns algorithm uses heavy computations of all-to-all paths to build a restricted graph to run the queries on, while several approaches work with more classical graph representation of the network and adapt known road network acceleration techniques to speed-up the search phase. For instance, the Public Transit Labeling algorithm proposes a hub-labeling acceleration technique, while in in another method, contraction hierarchy is adapted. In some cases, multi-criteria or multimodal versions have been designed.

This preprocessing step of the Trip-Based Public Transit Routing is correct, in the sense that it guarantees that a complete set of solutions can be computed in the reduced graph for two types of queries: earliest arrival time queries and profile queries.

Note that the backward search (also called latest departure time queries) for both query types is correct in the search graph built by the preprocessing.

The preprocessing improves the query times by dividing them by a factor of about 3.

The modification of the preprocessing phase for the cluster-based search proposed here has two sources of inspiration. The first is a set of techniques which are often called overlay building. It consists in adding nodes and arcs (the overlay) to the graph and using them to arrive at destination exploring less arcs, as they represent short cuts between different parts of the graph. The second is the classical so-called directed search, which use the knowledge of the origin and destination to prune the search graph.

Figure 9:
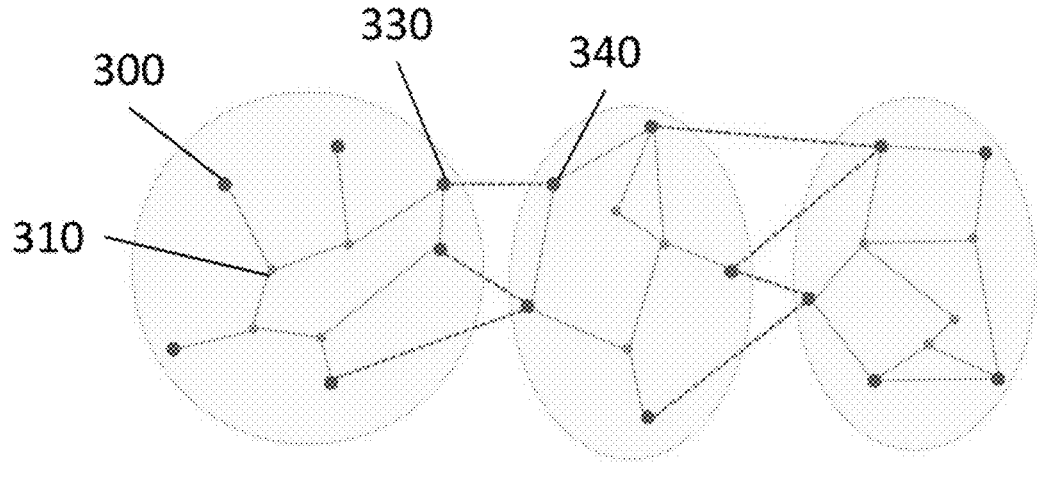
FIG. 9 illustrates the partitioning of the stops of a small graph.
Figure 10:
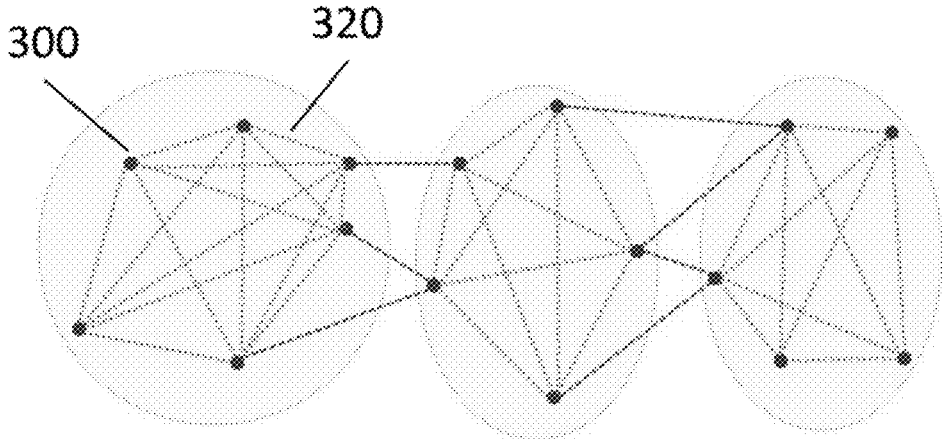
FIG. 10 illustrates the corresponding overlay for FIG. 9.

As an example, an overlay building method is illustrated in FIGS. 9 and 10. The idea is to partition the graph in a balanced way using an arc separator method. Then the node (300) of the cluster belonging to arcs of the separator represents its border. For a given cluster, the optimal paths between any pair of border nodes (330 and 340) are computed, creating shortcuts 320 in the graph.

Figure 11:
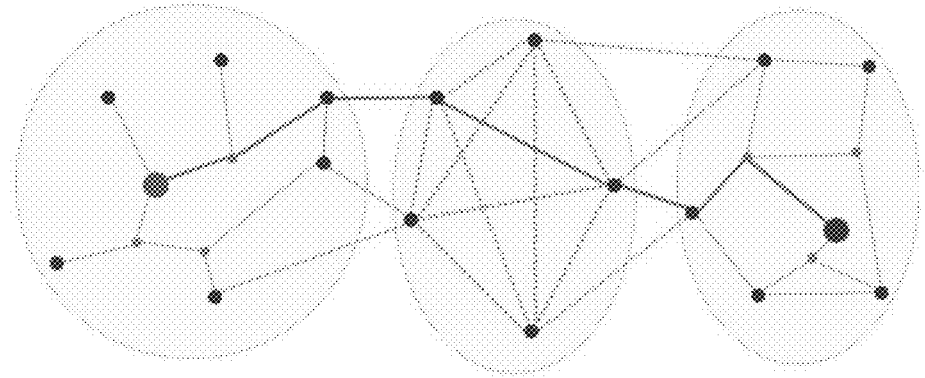
FIG. 11 illustrates the path between an origin and a destination using the overlay of FIG. 10 for the graph of FIG. 9.

The idea is then to use local arcs (not belonging to the separators) only when in the cluster of the origin point or the cluster of the destination point. Otherwise, the search phase uses only the overlay graph, as illustrated in FIG. 11.

In a goal directed search, the main idea is to try and limit the quantity of arcs and nodes explored in the graph by using knowledge of the destination's general direction. For instance, methods, such as A* or ALT, use lower bound on the distance to destination of intermediary nodes in order to select the most promising arcs during the exploration.

In graph theory, the concepts of graph clustering and of graph partitioning are rather informal concepts, which usually mean in both cases partitioning the vertex set under some constraints in order to maximize (or minimize) an objective function.

In graph partitioning, there tends to be an emphasis on edges (a good partition is usually defined as one in which the number of edges between separated components is small), while clustering puts an emphasis on vertices (a good clustering usually implies that the clusters are reasonably dense subgraphs, and clustering algorithms do not necessarily need a graph, an embedding of vertices on a metric space is sufficient).

In routing algorithms using cluster-based techniques, both graph partitioning and graph clustering have been considered. In order to make this type of techniques effective for routing, several properties are desirable in the graph partitioning.

First, it might be relevant to try and limit the number of border nodes. The number of short cuts that need to be computed is strongly dependent of the number of border nodes. Classically, this is done by optimizing the number of elements in the separator or directly the number of border nodes.

Second, in order to limit local search queries duration, it is desirable to limit the size of the clusters. A classical approach is to try and balance the number of elements in each cluster adding balancing constraints or a balancing criterion.

Such graph partitioning problems are often intractable. For example, one of the simplest graph partitioning problems is the unweighted bisection in undirected graphs problem, which consists in dividing the vertices in two sets of equal size such that the number of edges between these two parts is minimized. For this problem, it has been proved that no polynomial time algorithm can approximate the optimal solution within a constant factor unless P=NP. Heuristic techniques, such as the METIS algorithm, are hence often used to tackle those partitioning problems.

For routing in multimodal or public transit networks, algorithms can use partition-based acceleration techniques.

The method disclosed here is as follows. First, the stops of the public transit data are partitioned into clusters. Then for a given origin cluster and a given destination cluster, sets of lines or set of trips sufficient to compute a complete solution set, for any start time and start time range, any origin station in the first cluster, and any destination station in the destination cluster are determined (origin and destination clusters can be identical). Then, at query time, depending on the origin and destination, use only a precomtwo stops. But for some instances, it is possible to find in optimal solutions some lines that use stops both from S and its complement S', or serve stops of S that are close enough from a stop of S' ($\Delta\tau_{fp}$ is defined). To decide whether to include them, the notion of entry and exit points of S, is introduced. Entry and exit points are pairs (L, i) where L is a line and i is an index in the sequence of L.

An entry point is such that it will be possible to "enter" the set S at (L, i), either because L@i belongs to S and L@(i−1) belongs to S' or because it is possible to walk to L@i from a stop of S'.

Hence, $(L_{entry}, i_{entry})$ is an entry point of S if:

$$\begin{cases} i_{entry} \geq 1 \text{ and } L_{entry}@i_{entry} \in S \text{ and } L_{entry}@(i_{entry} - 1) \notin S \\ \text{or } L_{entry}@i_{entry} \in S \text{ and } \exists\, q \notin S \text{ such that } \Delta\tau_{fp}(q, L_{entry}@i_{entry}) \text{ is defined.} \end{cases}$$

puted subset of the lines or a precomputed subset of the trips of the network during the search phase, which improves the computation times.

Note that unlike in the classical overlay techniques, no short cuts are stored. Since the search space is pruned (keeping only a subset of the lines) depending on the origin and destination points, the method is goal directed. Pruning the search space is a conventional method to reduce the query times, and this pruning of the lines or the trips could be used in other algorithms, possibly with other data models for the public transit network. Although the general idea is similar to previous works, specific methods are required for implementation in the Trip-Based Public Transit Routing algorithm.

To describe in detail the methods for the preprocessing and the query phases, the description will utilize the notation described above and discuss the partitioning of the stops for classical algorithms.

For public transit algorithms, it is difficult to decide if the partition or clustering should put an emphasis on the geographical proximity (because of the possibility of walking between the stations) or on the network design for using the public transportation.

In the case of foot travel, the geographical proximity between stops is paramount, so a clustering approach seems more adapted. On the other hand, in the case of public transports, the geographical proximity is not as significant as the existence of a line that links two stops.

Moreover, depending on the way the network is modelled as a graph, some elements of the network (lines for instance) can be represented as edges in a model, and as vertices in another.

The structure of the network to cluster is hence likely to play a part in the choice of the clustering algorithm. In the method discussed below, the method uses a clustering or a partitioning of the stops in non-overlapping clusters. The method can use any such partition.

Consider that the stops are partitioned into sets $S_1$, $S_2, \ldots, S_p$. We first want to consider the case where origin and destination stops are in the same set $S_j$.

Given a set of stops (or cluster) S, a crown C is built for this set. The crown is a set of lines that can be useful when search queries are performed between stops of set S. It is noted that given a network restricted to the computed set of lines, it will be possible to calculate a complete set of solutions for the chosen criteria for any origin and destination stops belonging to the cluster.

Obviously, any line that directly links two stops of set S is likely to belong to at least one optimal path between those In a similar way, an exit point is a pair $(L_{exit}, i_{exit})$ such that it is possible to "leave" the set S at $L_{exit}@i_{exit}$:

$$\begin{cases} i_{exit} < |\vec{p}(L)| - 1 \text{ and } L_{exit}@i_{exit} \in S \text{ and } L_{exit}@(i_{exit} + 1) \notin S \\ \text{or } L_{exit}@i_{exit} \in S \text{ and } \exists\, q \notin S \text{ such that } \Delta\tau_{fp}(L_{exit}@i_{exit}, q) \text{ is defined.} \end{cases}$$

Now that entry and exit points are defined, the preceding can be used to more formally define the crown C of set S.

Given a line L, if there exists $i < |\vec{p}(L)|$ such that $L@i \in S$ and $L@(i+1) \in S$, then $L \in C$.

Given a line L, if there exists an entry point $(L_{entry}, j_{entry})$ of S, and an exit point $(L_{exit}, j_{exit})$ of S such that a trip of L belongs to at least one Pareto-optimal journey between $(L_{exit}, j_{exit})$ and $(L_{entry}, j_{entry})$ in a reference complete solution set, then $L \in C$.

Note that with this definition, a given cluster does not necessarily have a unique crown, as complete sets are usually not unique for an origin-destination pair (and a given start time or start time range). However, to guaranty optimality, the method only needs to be able to compute one optimal set for a given origin-destination pair. Hence, during the search phase, if the origins and destinations belong to the same cluster S, it will be possible to restrict the search to lines that belong to the crown of that set and obtain a complete set of solutions.

Note that based on the same preprocessing of a reference complete solution set, the crown can be defined as the set of trips that belong to at least one Pareto-optimal journey between $(L_{exit}, i_{exit})$ and $(L_{entry}, i_{entry})$ in a reference complete solution set Similarly, the set $L_{i \rightarrow j}$ of the lines that can be useful when traveling from one set $S_i$ to a set $S_j$ are defined.

Given a line L, if there exists an exit point $(L_{exit}, k)$ of $S_i$, and an entry point $(L_{entry}, k)$ of $S_j$ such that a trip of L belongs to at least one Pareto-optimal journey between $(L_{exit}, k)$ and $(L_{entry}, k')$ in a chosen complete solution set, then $L \in L_{i \rightarrow j}$.

During the search phase if the origins are in the set $S_i$ and the destinations in the set $S_j$, it will be possible to restrict the search to the crowns $C_i$ and $C_j$ and to the links $L_{i \rightarrow j}$.

As mentioned, this is different from overlay techniques, where the complete solution sets for entry and exit nodes should be saved as short cuts. Here, the complete solution sets are not kept as the space needed could be extremely large (especially for criteria with possibly exponential size complete solution sets). In crowns and links, only a set of lines is kept, which is very limited in terms of memory consumption.

In the case where crowns and links are defined as trip sets, the memory consumption would be higher, but still less than in the case of shortcuts.

In order to determine crowns and links for a given clustering of the stops, many-to-many profile queries need to be performed on a whole day from exit points to entry points. It will enable to establish the list of all the lines or trips used in the set of optimal solutions returned.

A possibility to obtain this result is to perform sequentially or in parallel one-to-many profile queries over an entire day from each exit point of the origin cluster to all entry points of the destination cluster. The pseudo-code of FIG. 12 details the computation process.

The Trip-Based Public Transit Routing algorithm needs few modifications to obtain a one-to-many version.

The principle is to redesign the query algorithm in order to take several destinations into account instead of one, and to return a vector of sets of Pareto-optimal journeys. The search phase of the Trip-Based Public Transit Routing algorithm is not directed, that is, it depends only on the origin if no pruning is added to reduce the search space. It hence marks all the trips that can be reached from origin given the maximum number of transfers. This implies that the main modification is to be done when a trip is checked for being a target trip. Instead of having only one set of target trips corresponding to one destination, each destination is to have its own target trip set and a trip segment must be checked for all. The pseudo-code for FIG. 13 describes the one-to-many profile queries.

Figure 14:
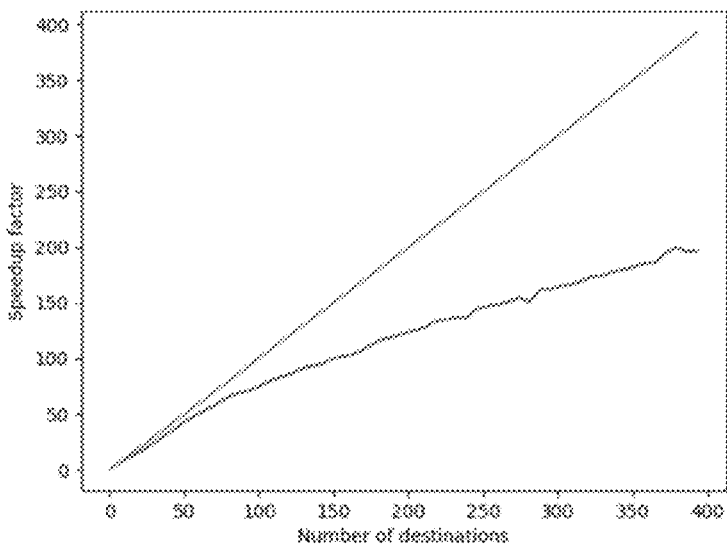
FIG. 14 graphically shows reducing the crowns and links preprocessing time significantly compared to running the equivalent one-to-one profile queries for one-to-many profile queries.

The complexity of a one-to-many profile query is hence the same as for a one-to-one profile query, which allows reducing the preprocessing time of crowns and links building significantly compared to running the equivalent one-to-one profile queries as shown in FIG. 14, which indicates the measured speed-up factor obtained by using one-to-many queries compared to the equivalent one-to-one queries.

In Agarwal and Rambha, 2021, the authors propose an alternative way of computing one to many queries. However, their method possibly enqueue the same trip segment several times, roughly multiplying the number of ENQUEUE operations necessary for the computation by the number of destinations. It is not the case in the method described herein where a trip segment is added at most once to the queue.

Note also that a stop, s, can correspond to several entry and exit points. The computations of profiles queries must hence be done only once per origin for all the relevant destinations.

Although it has not been done in the tests of the method, the preprocessing can be easily parallelized. In fact, the computations for each origin are independent and can hence be performed on different threads. As merging the sets obtained for each origin is not a very costly computation, the speed improvement is expected to be close to linear in the number of threads.

The pseudo-code of FIG. 13 can be adapted to use other one-to-one, one-to-many or many-to-many optimal public transit routing algorithms than the algorithm of FIG. 13. It is not dependent of the criteria optimized or of the public transit algorithm used. The method could hence be implemented with other routing engines. However, the Trip-Based Public Transit Routing algorithm is very efficient for profile queries and its property of not being directed makes it a good choice for one-to-many queries when minimizing the number of transfers and the arrival time.

Once the links and crowns have been calculated for every cluster, the information allows for the discarding of a subset of lines during the search, reducing the search space, and thus improving the speed of the algorithm.

The last part that needs to be adapted concerns the fact that earliest arrival time queries do not start from a vertex of the trip-based graph (that is a trip), but from a physical location somewhere in the network. From this location, the user can walk to a number of stops to take a public transit trip and start the journey, and these stops might be located in several distinct clusters. The same phenomenon can happen with the arrival location. A consequence is that there is not necessarily a unique 'origin cluster', and a unique 'destination cluster.' The user might starts the path from several clusters, and the user can end the path walking to destination from several clusters.

To tackle this issue, the search uses the union of all the crown and link line sets corresponding to the different combination of origin and destination clusters. To make it computationally efficient, a binary mask is used to determine which lines or trips can potentially be part of the search for a given query, and which lines or trips cannot.

FIG. 19 illustrates a pseudo-code of the whole search phase.

It is noted that in some algorithms, the search can depart from and arrive to only one station at a time. This restriction would help the algorithm perform better, as the number of departure clusters and arrival clusters would be one. This constraint is not assumed in the method as it is not likely from a practical point of view that the user would be able to choose a priori the best departure station without an extensive knowledge of the corresponding part of the public transit network, unless there is only one station close to the start position. In practice, the algorithm should be able to find complete paths, including departure and arrival stations for a given position in the graph, under the hypothesis that the user can move to the nearby stations.

This has a strong influence on the partitioning efficiency: if the arrival or departure points are many, the likeliness that they are in different clusters is increased and the quantity of lines or trips involved in the query phase will be higher.

A first criterion for the partitioning method is the execution time of the preprocessing step computing the partitioning and the corresponding crowns and links. When computing one day profile queries, the complete solution path set (in terms of line succession) is often robust to delays. In the proposed preprocessing, the lines used in those optimal paths belong to crowns or links. As a consequence, it would be possible to consider that the preprocessing step computing crowns and links needs to be redone only when the static information is changing. With this assumption, several hours of precomputations seems admissible.

The duration of the preprocessing is directly related to the number of entry and exit stops. A desirable property of the partitioning is hence to limit the number of entry and exit stops, to limit the computation time, which should be below a several hours bound. If the network is small, the bound will be easily respected. If the network is large, computing crowns and links can be quite expensive as it relies on whole day profile queries. It is then important to limit the number of entry and exit stops. This will obviously be easier in the case of well-structured networks, where several natural clusters are linked by only a few lines. This is the case of country size networks where several big metropolises are linked by a few train or bus lines.

For the preprocessing phase duration, having well balanced clusters seems less important than well separated ones in terms of transfers (footpaths) and lines going from one cluster to another. However, for the query time reduction, this criterion might be important.

The final objective of the cluster-based search is to reduce the search time. The evaluation of each clustering on this criterion is time consuming as it requires running the pre-processing and then sufficiently many queries to assess the mean query time. The query time is directly related to the sizes of the line sets for each query. It could hence be considered as an approximation for avoiding running sys-tematically earliest arrival time and profile queries to evalu-ate the clusterings, but the preprocessing part would still be required.

The present method does not rely upon a specific method for clustering the public transit networks. The method can use any clustering of the stops. However, as explained, it is necessary to consider the above clustering objectives when the clustering method is chosen to obtain better query time results and limited preprocessing time.

To assess the proposed method, several off the shelf clustering algorithms were tested with several network rep-resentations as graphs. The three representations considered here are the following.

Dummy graph model: This is a very simple model, based on an intuitive representation of a public transportation network. Vertices are the stops of the network, and edges connect together consecutive stops on a line. Footpaths are ignored, as well as the stops' positions on the map.

Stops graph: In this graph, the vertices are the stops of the network. Two vertices u and v (representing the stops u and v) are connected with an edge if there exists a line L such that u=L@i and v=L@(i+1) (there are consecutive stops on the same line) or if $\Delta\tau_{fp}(u, v)$ is defined. The edges can then be weighted according to the walking distance between stops and to the number of trips or lines that the two stops have in common, and their distance in number of stops on these lines.

Line graph: In this graph, the lines are the vertices. There is an edge between two lines if the two lines have a stop in common, or if a transfer is possible between stops of those routes (meaning there is an edge from L1 to L2 if and only if there are indices i and j such that $\Delta\tau_{fp}$ (L1@i, L2@J) is defined). The edges can be weighted according to the number of stops in common, the number of possible trans-fers between routes and their walking distances.

As an additional constraint, the same models were tested where the stops that are at the same geographical position (or very closed from one another), are aggregated together. The additional constraint ids denoted as "regroup".

A summary of results for the different clustering or partitioning techniques tested can be found in the Table of FIG. 20.

To partition graphs, the well-known METIS algorithm was used, which is designed to optimize the total cut weight and the balance of the partitions.

Since, for every stop in the network, its position on earth (latitude and longitude) is known, it is therefore possible to consider these stops as a cloud of points in the plane (for instance using the Universal Mercator coordinate system to project the stops in a plane). Clustering algorithms can hence also be run directly on the stops' coordinates, using Euclid-ean distance between the stops as element wise distance.

For this model, implementations provided by the Python libraries SciPy and scikit-learn for hierarchical clustering and Density Based Spatial Clustering of Applications with Noise (DBSCAN) can be used.

For the METIS partitioning algorithm, the fact that it tries to balance the partition prevents the network from being partitioned well. Having strictly balanced partitions is a strong constraint, which is not required. When tested with the standard version, large cuts were often obtained.

The hierarchical clustering requires computing the entire distance matrix of the cloud of points it takes as input. This leads to high memory requirements, and large clustering time (up to 250 GB of memory, and 30 minutes for the South Korean network). However, the method is usually the best in terms of cuts.

The method was tested with different linkage methods (inter clusters distances), which gave slightly better results with the ward linkage method when tested against others (simple, centroid, weighted, average and median).

The DBSCAN method does not affect all points to an existing cluster, which would result in additional clusters with only one point, and hence highly unbalanced clusters. Although as mentioned, the balanced criterion is not as important as the cut size, it is preferred to avoid this solution which requires manual modifications of the clustering to repair those one-element clusters. Thus, the hierarchical clustering algorithm was used to cluster the public transit networks in the tests.

As indicated, other clustering or partitioning algorithms could have been considered.

The tests were run on the Netherlands public transport network clustered in 22 clusters. The network has about 31 K stops, 1M trips, and 12M of arrival times in the timetable. For this clustering, the preprocessing lasted about 20 min. The performance of the cluster-based search is compared to the performance of the 'classic' Trip-Based Public Transit Routing algorithm search.

Two performance metrics were chosen: the number of push/pops on the queue (queue size), and the execution time of the query. On the Netherlands network, an average speed-up of 40% (meaning the cluster-based search is run-ning almost twice faster than the 'classic' Trip-Based Public Transit Routing algorithm search), and an average reduction of the queue size of 60%.

The results are even more pronounced when compared to queries where the origin and destination points are located in distant clusters. A test done on 5000 random queries between locations situated in distant clusters gave reduction of the execution time (resp. reduction of the queue size) of 80% (resp. 86%).

Similar results have been found on the Switzerland net-work, with cluster-based search running in average 54% faster, with a 70% queue size reduction (resp. 47% faster, with a queue size reduced by 68%), than its classical counterpart on a data set of 5000 random queries when dividing the network in 31 clusters (resp. 24 clusters).

Figure 15:
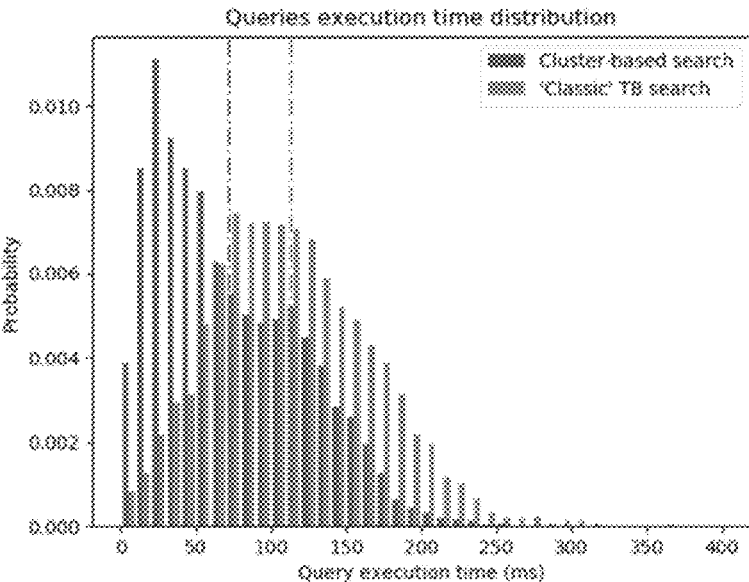
FIG. 15 illustrates a graph comparing distributions of query execution time on a sample of 5000 random queries for the Trip-Based Public Transit Routing algorithm and the method described below.
Figure 16:
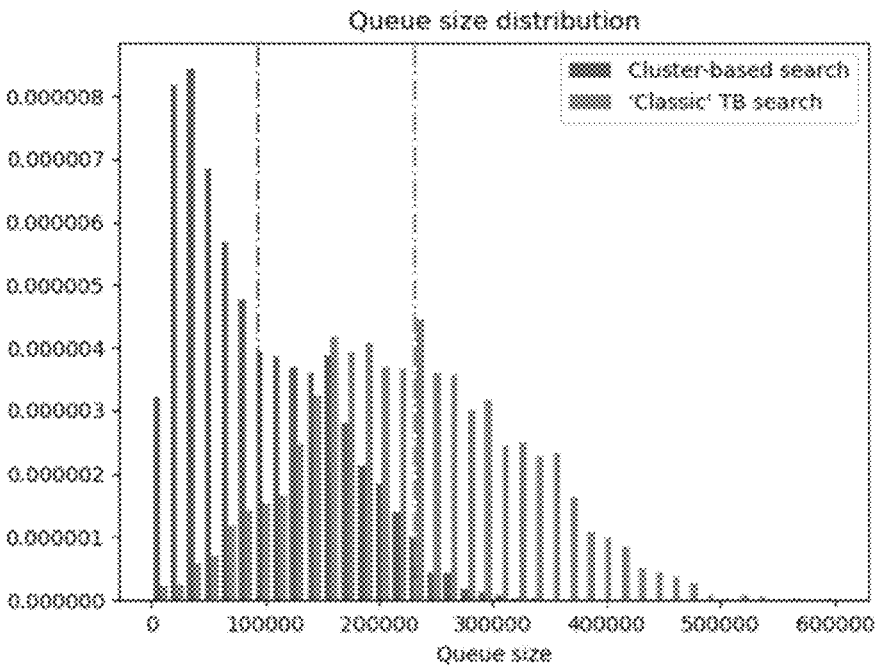
FIG. 16 illustrates a graph comparing distributions of queue size on a sample of 5000 random queries for the Trip-Based Public Transit Routing algorithm and the method described below.

FIG. 15 illustrates the distributions of query execution time on a sample of 5000 random queries, in the Netherlands network (clustered in 22 clusters using hierarchical cluster-ing method). FIG. 16 illustrates the distributions of queue size on a sample of 5000 random queries, in the Netherlands network (clustered in 22 clusters using hierarchical cluster-ing method). The dotted vertical lines represent the average values.

Figure 17:
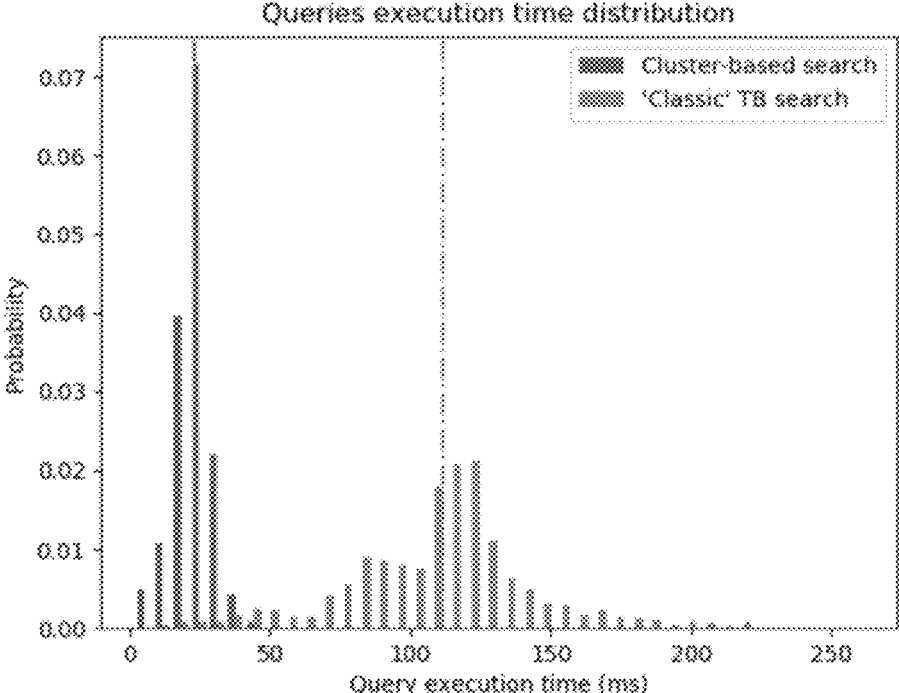
FIG. 17 illustrates a graph comparing distributions of query execution time on a sample of 5000 random queries going from a point in cluster 12 to a point in cluster 4 of the Netherlands network for the Trip-Based Public Transit Routing algorithm and the method described below.
Figure 18:
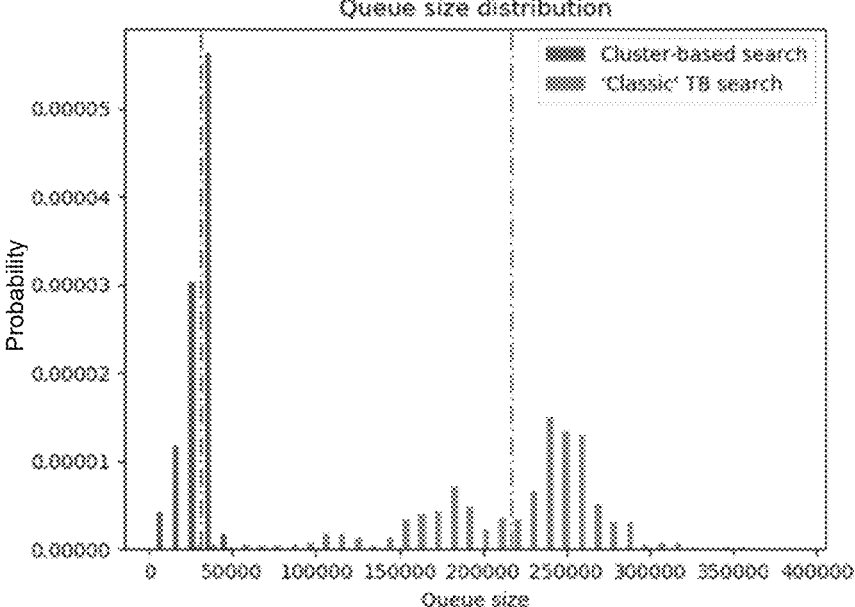
FIG. 18 illustrates a graph comparing distributions of queue size on a sample of 5000 random queries going from a point in cluster 12 to a point in cluster 4 of the Netherlands network for the Trip-Based Public Transit Routing algorithm and the method described below.

FIG. 17 illustrates the distributions of query execution time, on a sample of 5000 queries going from a point in cluster 12 to a point in cluster 4, in the Netherlands network (clustered in 22 clusters using hierarchical clustering method). FIG. 18 illustrates the distributions of queue size, on a sample of 5000 queries going from a point in cluster 12 to a point in cluster 4, in the Netherlands network (clustered in 22 clusters using hierarchical clustering method). The dotted vertical lines represent the average values.

Netherlands and Switzerland are well structured networks with somewhat natural clusters. For networks with more interconnection of lines or denser stop locations, it is possible that cluster design requires more specific algorithm or models.

Figure 21:
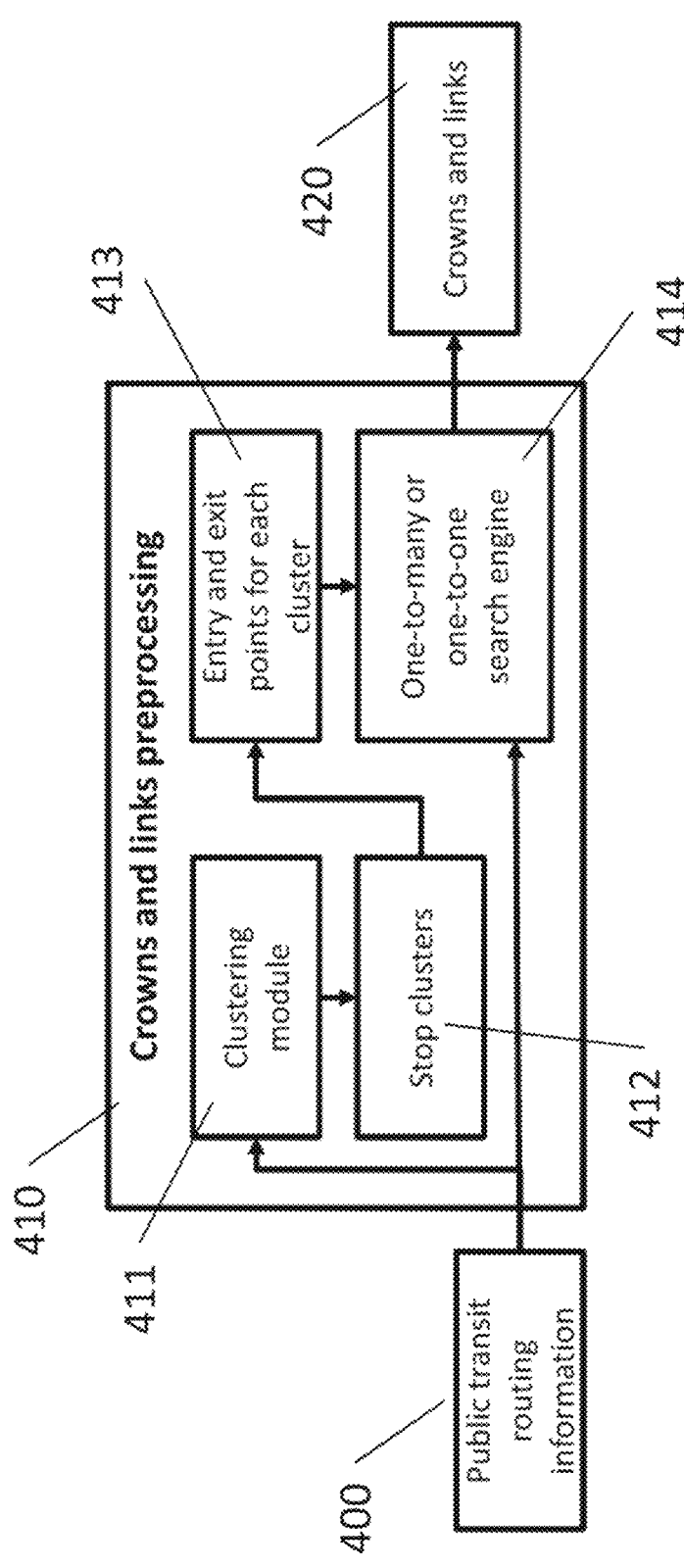
FIG. 21 illustrates the workflow of the preprocessing step of crowns and links computation.

FIG. 21 illustrates the workflow of the preprocessing step of crowns and links computation. As illustrated in FIG. 21, public transit routing information 400 is fed to a crowns and links preprocessing module 410. As described above, the set of stops in the public transit routing information 400 is partitioned to form clusters of stops 412 in a clustering module 411. The entry and exit points for each cluster are determined in module 413.

The public transit routing information 400 and the entry and exit points for each cluster are fed to a one-to-many or a one-to-one search engine 414 which is called several times to outputs a reference solution set for crown computations and a reference solution set for links computations from which the crowns and links 420 that are used in building trip sets are obtained.

Figure 22:
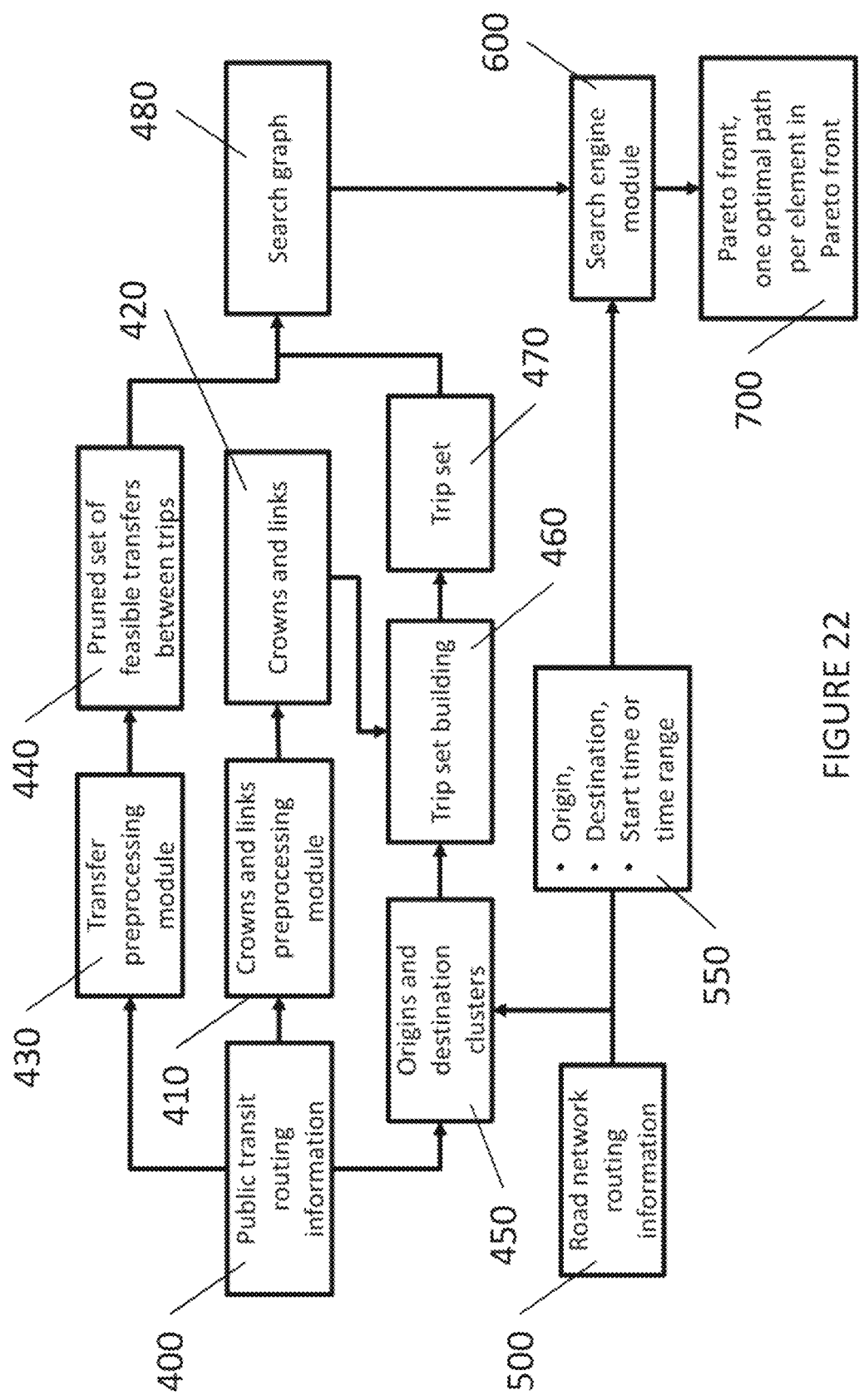
FIG. 22 illustrates the workflow of a method for computing a set of itineraries from a departure location to an arrival location using cluster-based searching.

FIG. 22 illustrates the workflow of a method for computing a set of itineraries from a departure location to an arrival location using cluster-based searching. As illustrated in FIG. 22, public transit routing information 400 is fed to a crowns and links preprocessing module 410, which outputs the crowns and links 420. The public transit routing information 400 is fed to a transfer preprocessing module 430, which outputs a pruned set of feasible transfers between trips 440.

Additionally, the public transit routing information 400, along with road network routing information 500 and origin, destination, start time or time range information 550, is fed to origins and destination clusters module 450, which outputs origin and destination clusters. The origin, destination, start time, or time range information 550 is also fed to a search engine module 600.

The crowns and links 420 and the origin and destination clusters are fed to a trip set building module 460, which outputs trips sets 470. The pruned set of feasible transfers between trips 440 and the trips sets 470 used to create a search graph 480, which is fed to the search engine module 600. Instead of building a trip set, in a preferred example, only a line set 470 is computed in a line set building 460 from which trips of 440 kept in the search graph 480 are deduced.

The search engine module 600 processes the search graph 480 and the origin, destination, start time or time range information 550 to produce a Pareto front and one optimal path per element in the Pareto front (700).

It is noted that the proposed preprocessing step could be applied to many public transit routing algorithms as its objective is to define the lines or trips to use at query time. Such pruning of the network at query time would need to be compatible with the preprocessing and model of the given algorithm, which will be the case for algorithms such as CSA or RAPTOR, whichever the routing algorithm used for preprocessing.

For other algorithms, such as Contraction hierarchy, the same algorithm would need to be used for preprocessing (without line pruning) and for queries (with line pruning). Otherwise, as a choice of optimal path is involved in the preprocessing (when shortcuts are computed), it might not be the same that the one used during the computation of crowns and links, leading to a non-optimal algorithm.

As discussed above, the method uses a preprocessing stage and associated query phase modifications for the Trip-Based Public Transit Routing algorithm. The proposed preprocessing step, selecting network parts to use in the search phase depending on the origin and destination, and the proposed cluster-based query phase are used with the Trip-Based Public Transit Routing algorithm.

In Agarwal and Rambha, 2021 the authors propose a different method for improving the query times based on clustering. The authors apply the method proposed in Delling et al. (2017) (Delling, D., J. Dibbelt, T. Pajor, and T. Zundorf (2017). Faster Transit Routing by Hyper Partitioning. In 17th Workshop on Algorithmic Approaches for Transportation Modelling, Optimization, and Systems (ATMOS 2017). Schloss Dagstuhl-Leibniz-Zentrum fuer Informatik) to the Trip-Based Public Transit Routing algorithm, using the hypergraph representation of Delling et al. 2017 as base of the clustering. The speed-up the authors report over the base Trip-Based Public Transit Routing algorithm are less than the results obtain with the method described above. As explained above, the method uses any clustering of the nodes and is not dependent of the model chosen to obtain them, as opposed to the method of Agarwal and Rambha.

Another difference is that the method described above considers crowns and links instead of a fill-in. The fill-in contains all the trips or the lines that can be used in the optimal computation of a path between the "cut stops", which are the stops of the cut hyper edges in the hypergraph. Using crowns and links avoids some limitations of the fill-in.

It is not necessary to use the whole fill-in when computing itineraries within a given cluster. In the method described above, only crowns are used. With the fill-in method, it would be possible to integrate only a part of the fill-in in the search, but the memory required would be more important, as the elements of the fill-in would be marked by the different stops or the different clusters.

A method for processing a set of feasible transfers (T) between trips and a set of trips (U) within a multimodal transportation network of predetermined stations to determine at least one itinerary between an origin and a destination, a trip t corresponding to a sequence of stops of a line L, $\vec{p}(L)=(L@0, L@1, \ldots)$, the method comprises: (a) electronically computing a set of feasible transfers (T) between stations of an origin trip t and a destination trip t'; (b) electronically partitioning a set of stops in the multimodal transportation network to form clusters, and for each cluster (S), computing the set of entry points $(L_{entry}, i_{entry})$ of cluster (S) to be such that, $$\begin{cases} i_{entry} \geq 1 \text{ and } L_{entry}@i_{entry} \in S \text{ and } L_{entry}@(i_{entry}-1) \notin S \\ \text{or } L_{entry}@i_{entry} \in S \text{ and } \exists q \notin S \text{ such that } \Delta\tau_{fp}(q, L_{entry}@i_{entry}) \text{ is defined,} \end{cases}$$

and computing the set of the exit points $(L_{exit}, i_{exit})$ of cluster (S) being such that $$\begin{cases} i_{exit} < |\vec{p}(L)|-1 \text{ and } L_{exit}@i_{exit} \in S \text{ and } L_{exit}@(i_{exit}+1) \notin S \\ \text{or } L_{exit}@i_{exit} \in S \text{ and } \exists q \notin S \text{ such that } \Delta\tau_{fp}(L_{exit}@i_{exit}, q) \text{ is defined,} \end{cases}$$

wherein L is a line, i is an index in the sequence of stops of L, q is a stop, and $\Delta\tau_{fp}(v,w)$ is a transfer duration between stops v and w; (c) electronically determining, for each cluster (S), a crown $(C_S)$, crown $(C_S)$ being defined as given a line L, if there exists $i<|\vec{p}(L)|-1$ such that L@i∈ S and L@(i+1)∈ S, then L∈ $C_S$; (d) electronically determining, for each cluster (S), links $(L_{S\to D})$ of cluster (S) to cluster (D) for all clusters (D) different from cluster (S), link $(L_{S\to D})$ being defined as given a line L, if there exists an exit point $(L_{exit}, i_{exit})$ of S, and an entry point $(L_{entry}, i_{entry})$ of D such that a trip of L belongs to at least one journey between $(L_{exit}, i_{exit})$ and $(L_{entry}, i_{entry})$ in a reference solution set of link computations, then L∈ $L_{S\to D}$; (e) receiving a query to determine possible itineraries between an origin and a destination; (f) electronically computing a set of trips (U), to be used to process the received query, based upon the determined crowns $(C_S)$ and determined links $(L_{S\to D})$; and (g) electronically processing the received query, using only the computed set of trips (U) and the computed set of feasible transfers (T), to determine at least one itinerary for the origin, the destination, and a range of start times.

The crowns $(C_S)$ may be further defined as given a line L, if there exists an entry point $(L_{entry}, i_{entry})$ of S, and an exit point $(L_{exit}, i_{exit})$ of S such that a trip of L belongs to at least one journey between $(L_{exit}, i_{exit})$ and $(L_{entry}, i_{entry})$ in a reference solution set of crown computations, then L∈ $C_S$.

The electronically computed set of trips (U) may be further based upon the origin and the destination.

The reference solution set of crown computations may contain a complete solution set for a profile query between $(L_{entry}, i_{entry})$ and $(L_{exit}, i_{exit})$.

The reference solution set of link computations may be the union of complete solution sets for profile queries between an exit point (L, J) of S and an entry point (L', i') of D.

The reference solution set of crown computations may be the union of complete solution sets for profile queries between an entry point (L, i) and an exit point (L', i') of S.

The set of trips (U) may be the union of the trips of the crowns of all the clusters and trips of the links between all transfer pairs.

The complete solution sets may be obtained using a one-to-many exact profile query algorithm.

The electronically computing the set of trips (U) may be executed upon a model of the multimodal transportation network wherein public transit information is represented using a graph having nodes representing trips of the public transit network and arcs representing possible transfers (T) between two trips at given stops.

The processing of the query may be executed upon a model of the multimodal transportation network wherein public transit information is represented using a graph having nodes representing trips of the public transit network belonging to the set of trips (U) and arcs representing possible transfers (T) between two trips at given stops.

The reference solution sets of link computations may be computed using a model of the multimodal transportation network wherein public transit information is represented using a graph having nodes representing trips of the public transit network belonging to the set of trips (U) and arcs representing possible transfers (T) between two trips at given stops.

The reference solution sets of link and crowns computations may be computed using a model of the multimodal transportation network wherein public transit information is represented using a graph having nodes representing trips of the public transit network belonging to the set of trips (U) and arcs representing possible transfers (T) between two trips at given stops.

The range of start times may be a single start time.

The electronically computing of the set of trips (U) may be executed independently of the query.

The electronically computing of the crowns $(C_S)$ and the links $(L_{S\to D})$ may be executed independently of the query.

The method may further comprise: (h) selecting crowns $(C_S)$ from the determined the crowns $(C_S)$ based upon the origin and the destination; and (i) selecting links $(L_{S\to D})$ from the determined the links $(L_{S\to D})$ based upon the origin and the destination; the electronically computing the set of trips (U) electronically computing the set of trips (U) based upon the selected the crowns $(C_S)$, the selected links $(L_{S\to D})$.

A method for processing a set of feasible transfers (T) between trips and a set of trips (U) within a multimodal transportation network of predetermined stations to determine at least one itinerary between an origin and a destination, a trip t corresponding to a sequence of stops of a line L, $\vec{p}(L)=(L@0, L@1, \ldots)$, the method comprises: (a) receiving, via a user input interface, an origin (org), a destination (dest), and a start time range; (b) electronically computing a set of feasible transfers (T) between stations of an origin trip t and a destination trip t'; (c) electronically partitioning a set of stops in the multimodal transportation network to form clusters (S), and for each cluster (S), computing the set of entry points $(L_{entry}, i_{entry})$ of cluster (S) to be such that, $$\begin{cases} i_{entry} \geq 1 \text{ and } L_{entry}@i_{entry} \in S \text{ and } L_{entry}@(i_{entry}-1) \notin S \\ \text{or } L_{entry}@i_{entry} \in S \text{ and } \exists q \notin S \text{ such that } \Delta\tau_{fp}(q, L_{entry}@i_{entry}) \text{ is defined,} \end{cases}$$

and computing the set of the exit points $(L_{exit}, i_{exit})$ of cluster (S) being such that $$\begin{cases} i_{exit} < |\vec{p}(L)| - 1 \text{ and } L_{exit}@i_{exit} \in S \text{ and } L_{exit}@(i_{exit}+1) \notin S \\ \text{or } L_{exit}@i_{exit} \in S \text{ and } \exists q \notin S \text{ such that } \Delta\tau_{fp}(L_{exit}@i_{exit}, q) \text{ is defined,} \end{cases}$$

wherein L is a line, i is an index in the sequence of stops of L, q is a stop, and $\Delta\tau_{fp}(v,w)$ is a transfer duration between stops v and w; (d) selecting a set of origin clusters and a set of destination clusters, the set of origin clusters being clusters (S) having a stop s such that $\Delta\tau_{fp}(org,s)$ is defined, the set of destination clusters being clusters (D) having a stop s such that $\Delta\tau_{fp}(s,dest)$ is defined; (e) electronically determining, for each cluster (S) in the set of origin clusters, a crown $(C_S)$, crown $(C_S)$ being defined as given a line L, if there exists $i<|\vec{p}(L)|-1$ such that L@i∈ S and L@(i+1)∈ S, then L∈ $C_S$; (f) electronically determining, for each cluster (D) in the set of destination clusters, a crown $(C_D)$, crown $(C_D)$ being defined as given a line L, if there exists $i<|\vec{p}(L)|-1$ such that L@i∈ D and L@(i+1)∈ D, then L∈ $C_D$; (g) electronically determining links $(L_{S\to D})$ between each cluster (S) in the set of origin clusters and each cluster (D) in the set of destination clusters, each link $(L_{S\to D})$ being defined as given a line L, if there exists an exit point ($L_{exit}$, $i_{exit}$) of S, and an entry point ($L_{entry}$, $i_{entry}$) of D such that a trip of L belongs to at least one journey between ($L_{exit}$, $i_{exit}$) and ($L_{entry}$, $i_{entry}$) in a reference solution set of link computations, then $L \in L_{S \rightarrow D}$; (h) receiving a query to determine possible itineraries between the origin and the destination; (i) electronically computing a set of trips (U), to be used to process the received query, based upon the determined crowns ($C_S$), the determined crowns ($C_D$), and determined links ($L_{S \rightarrow D}$); and (j) electronically processing the received query, using only the computed set of trips (U) and the computed set of feasible transfers (T), to determine at least one itinerary for the origin, the destination, and a range of start times.

$\Delta\tau_{fp}$(a, b) may be defined if the travel time between the two points a and b is below a threshold M.

$\Delta\tau_{fp}$(org, s) may be defined if the travel time between org and s is below a threshold $M_{org}$.

$\Delta\tau_{fp}$(s, dest) may be defined if the travel time between s and dest is below a threshold $M_{dest}$.

The threshold M may be received via a user interface.

$M_{org}$ may be received via a user interface.

$M_{dest}$ may be received via a user interface.

$M_{org}$ and $M_{dest}$ may be received via a user interface.

$\Delta\tau_{fp}$(org, s) may be defined if the travel time for walking between org and s is below a threshold $M_{org}$.

$\Delta\tau_{fp}$(a, b) may be defined if the amount of distance allowed for walking between a and b is below a threshold M.

$\Delta\tau_{fp}$(s, dest) may be defined if the travel time for walking between s and dest is below a threshold $M_{dest}$.

The crowns of a cluster F ($C_F$) may be further defined as given a line L, if there exists an entry point ($L_{entry}$, $i_{entry}$) of F, and an exit point ($L_{exit}$, $i_{exit}$) of F such that a trip of L belongs to at least one journey between ($L_{exit}$, $i_{exit}$) and ($L_{entry}$, $i_{entry}$) in a reference solution set of crown computations, then $L \in C_F$.

The electronically computing the set of trips (U) may be further based upon the origin and the destination.

The reference solution set of crown computations set may contain a complete solution set for a profile query between ($L_{entry}$, $i_{entry}$) and ($L_{exit}$, $i_{exit}$).

The reference solution set of link computations may contain a complete solution set for a profile query between ($L_{exit}$, $i_{exit}$) and ($L_{entry}$, $i_{entry}$).

The reference solution set of link computations may be the union of complete solution sets for profile queries between an exit point ($L_{exit}$, $i_{exit}$) of S and an entry point ($L_{entry}$, $i_{entry}$) of D.

The reference solution set of crown computations may be the union of complete solution sets for profile queries between an entry point ($L_{entry}$, $i_{entry}$) and an exit point ($L_{exit}$, $i_{exit}$) of S.

The set of trips (U) may be the union of the trips of the crowns of all the clusters and trips of the links between all transfer pairs.

The complete solution sets may be obtained using a one-to-many exact profile query algorithm.

The electronically computing the set of trips (U) may be executed upon a model of the multimodal transportation network wherein public transit information is represented using a graph having nodes representing trips of the public transit network and arcs representing possible transfers between two trips at given stops.

The processing of the query may be executed upon a model of the multimodal transportation network wherein public transit information is represented using a graph having nodes representing trips of the public transit network belonging to the set of trips (U) and arcs representing possible transfers (T) between two trips at given stops.

The reference solution sets of link computations may be computed using a model of the multimodal transportation network wherein public transit information is represented using a graph having nodes representing trips of the public transit network belonging to the set of trips (U) and arcs representing possible transfers (T) between two trips at given stops.

The range of start times may be a single start time.

The electronically computing the set of trips (U) may be executed independently of the query.

The electronically computing of the crowns ($C_S$) and the links ($L_{S \rightarrow D}$) may be executed independently of the query for all clusters S and all cluster pairs (S, D).

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A method for reducing computation time for a computer, having an electronic processor and an electronic memory, processing a set of feasible transfers (T) between trips and a set of trips (U) within a multimodal transportation network of predetermined stations to determine at least one optimal itinerary between an origin and a destination, a trip corresponding to a sequence of stops of a line L, $\vec{p}$ (L)= (L@i, L@i+1, . . . ) wherein L@ is a stop in the sequence of stops and i is a position of the stop L@ within the sequence of stops, the method comprising:

(a) electronically computing a set of feasible transfers (T) between stations of an origin trip t and a destination trip t';

(b) reducing computation time for the computer processing the set of feasible transfers (T) between trips and a set of trips (U) within a multimodal transportation network of predetermined stations to determine at least one itinerary between an origin and a destination by (b1) electronically partitioning a set of stops in the multimodal transportation network to form clusters, and for each cluster (S), computing a set of entry points ($L_{entry}$, $i_{entry}$) of cluster (S) to be such that position value ($i_{entry}$) is greater than or equal to one, stop ($L_{entry}$) at position ($i_{entry}$) is part of cluster (S), and the stop ($L_{entry}$) at a position before position ($i_{entry}$) is not part of cluster (S) is defined, and computing a set of the exit points ($L_{exit}$, $i_{exit}$) of cluster (S) being such that position value ($i_{exit}$) is less than one less than a number of stops of line L, stop ($L_{exit}$) at position ($i_{exit}$) is part of cluster (S), and the stop ($L_{exit}$) at a position after position ($i_{exit}$) is not part of cluster (S) is defined, (b2) electronically determining, for each cluster (S), a crown ($C_S$), crown ($C_S$) being a set of lines that form part of at least one Pareto-optimal journey for any origin-destination within a cluster and being defined for a given line L, if there exists position value (i) is less than one less than a number of stops of line L such that sop L@i is part of cluster (S) and stop L@(i+1) is part of cluster (S), then line L is part of crown ($C_S$), and (b3) electronically determining, for each cluster (S), links ($L_{S \to D}$) of cluster (S) to cluster (D) for all clusters (D) different from cluster (S), link ($L_{S \to D}$) being defined for a given line L, if there exists an exit point ($L_{exit}$, $i_{exit}$) of S, and an entry point ($L_{entry}$, $i_{entry}$) of D such that a trip of L belongs to at least one journey between ($L_{exit}$, $i_{exit}$) and ($L_{entry}$, $i_{entry}$) in a reference solution set of link computations, then L is part of links ($L_{S \to D}$) of cluster (S) to cluster (D) for all clusters (D) different from cluster (S);

(c) receiving a query to determine possible itineraries between an origin and a destination;

(d) electronically computing a set of trips (U), to be used to process the received query, based upon the determined crowns ($C_S$) and determined links ($L_{S \to D}$); and (e) electronically processing the received query, using only the computed set of trips (U) and the computed set of feasible transfers (T), by electronically performing a routing optimization algorithm to electronically compute a Pareto front, the routing optimization algorithm, using the computed Pareto front, generating at least one optimal itinerary for the origin, the destination, and a range of start times.

2. The method as claimed in claim 1, wherein the crowns ($C_S$) are further defined for a given line L, if there exists an entry point ($L_{entry}$, $i_{entry}$) of S, and an exit point ($L_{exit}$, $i_{exit}$) of S such that a trip of L belongs to at least one journey between ($L_{exit}$, $i_{exit}$) and ($L_{entry}$, $i_{entry}$) in a reference solution set of crown computations, then line L is an element of the crowns $C_S$.

3. The method as claimed in claim 2, wherein the reference solution set of crown computations includes a complete solution set for a profile query between ($L_{entry}$, $i_{entry}$) and ($L_{exit}$, $i_{exit}$).

4. The method as claimed in claim 3, wherein the reference solution set of link computations includes a complete solution set for a profile query between ($L_{exit}$, $i_{exit}$) and ($L_{entry}$, $i_{entry}$).

5. The method as claimed in claim 4, wherein the complete solution sets are obtained using a one-to-many exact profile query algorithm.

6. The method as claimed in claim 3, wherein the reference solution set of link computations is a union of complete solution sets for profile queries between a given exit point ($L_{exit}$, $i_{exit}$) of S and a given entry point ($L'_{entry}$, $i'_{entry}$) of D.

7. The method as claimed in claim 6, wherein the complete solution sets are obtained using a one-to-many exact profile query algorithm.

8. The method as claimed in claim 3, wherein the complete solution sets are obtained using a one-to-many exact profile query algorithm.

9. The method as claimed in claim 2, wherein the reference solution set of link computations includes a complete solution set for a profile query between ($L_{exit}$, $i_{exit}$) and ($L_{entry}$, $i_{entry}$).

10. The method as claimed in claim 9, wherein the reference solution set of crown computations is a union of complete solution sets for profile queries between a given entry point ($L_{entry}$, $entry$i) and a given exit point ($L'_{exit}$, $i'_{exit}$) of S.

11. The method as claimed in claim 10, wherein the complete solution sets are obtained using a one-to-many exact profile query algorithm.

12. The method as claimed in claim 9, wherein the complete solution sets are obtained using a one-to-many exact profile query algorithm.

13. The method as claimed in claim 2, wherein the reference solution set of link computations is a union of complete solution sets for profile queries between a given exit point ($L_{exit}$, $i_{exit}$) of S and a given entry point ($L'_{entry}$, $i'_{entry}$) of D.

14. The method as claimed in claim 13, wherein the reference solution set of crown computations is a union of complete solution sets for profile queries between a given entry point ($L_{entry}$, $entry$i) and a given exit point ($L'_{exit}$, $i'_{exit}$) of S.

15. The method as claimed in claim 14, wherein the complete solution sets are obtained using a one-to-many exact profile query algorithm.

16. The method as claimed in claim 13, wherein the complete solution sets are obtained using a one-to-many exact profile query algorithm.

17. The method as claimed in claim 2, wherein the reference solution set of crown computations is a union of complete solution sets for profile queries between a given entry point ($L_{entry}$, $entry$i) and a given exit point ($L'_{exit}$, $i'_{exit}$) of S.

18. The method as claimed in claim 17, wherein the complete solution sets are obtained using a one-to-many exact profile query algorithm.

19. The method as claimed in claim 2, wherein the set of trips (U) is the union of a trips of a crowns of all the clusters and trips of the links between all transfer pairs.

20. The method as claimed in claim 2, wherein the reference solution sets of link and crowns computations are computed using a model of the multimodal transportation network wherein public transit information is represented using a graph having nodes representing trips of the public transit network belonging to the set of trips (U) and arcs representing possible transfers between two trips at given stops.

21. The method as claimed in claim 1, wherein said electronically computed set of trips (U) is further based upon the origin and the destination.

22. The method as claimed in claim 1, wherein the set of trips (U) is the union of the trips of the crowns of all the clusters and trips of the links between all transfer pairs.

23. The method as claimed in claim 1, wherein said electronically computing the set of trips (U) is executed upon a model of the multimodal transportation network wherein public transit information is represented using a graph having nodes representing trips of the public transit network and arcs representing possible transfers between two trips at given stops.

24. The method as claimed in claim 1, wherein said processing of the query is executed upon a model of the multimodal transportation network wherein public transit information is represented using a graph having nodes representing trips of the public transit network belonging to the set of trips (U) and arcs representing possible transfers between two trips at given stops.

25. The method as claimed in claim 1, wherein the reference solution sets of link computations are computed using a model of the multimodal transportation network wherein public transit information is represented using a graph having nodes representing trips of the public transit network belonging to the set of trips (U) and arcs representing possible transfers between two trips at given stops.

26. The method as claimed in claim 1, wherein the range of start times is a single start time.

27. The method as claimed in claim 1, wherein said electronically computing of the set of trips (U) is executed independently of the query.

28. The method as claimed in claim 1, wherein said electronically computing of the crowns ($C_S$) and the links ($L_{S \to D}$) are executed independently of the query.

29. The method as claimed in claim 1, further comprising:

(f) selecting crowns ($C_S$) from the determined the crowns ($C_S$) based upon the origin and the destination; and (g) selecting links ($L_{S \to D}$) from the determined the links ($L_{S \to D}$) based upon the origin and the destination;

said electronically computing the set of trips (U) electronically computing the set of trips (U) based upon the selected the crowns ($C_S$), the selected links ($L_{S \to D}$).

\* \* \* \* \*